United States Patent
Yang et al.

(10) Patent No.: US 10,534,524 B2
(45) Date of Patent: Jan. 14, 2020

(54) METHOD AND DEVICE FOR CONTROLLING REPRODUCTION SPEED OF MULTIMEDIA CONTENT

(71) Applicant: SAMSUNG ELECTRONICS CO., LTD., Suwon-si (KR)

(72) Inventors: Pil-seung Yang, Seoul (KR); Da-hye Park, Suwon-si (KR); Seol-hye Won, Seoul (KR); Young-ah Seong, Seoul (KR); Yong-gook Park, Yongin-si (KR); In-kuk Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 15/664,434

(22) Filed: Jul. 31, 2017

(65) Prior Publication Data

US 2017/0329504 A1    Nov. 16, 2017

Related U.S. Application Data

(62) Division of application No. 14/815,312, filed on Jul. 31, 2015, now Pat. No. 9,753,626.

(30) Foreign Application Priority Data

Jul. 31, 2014  (KR) .................. 10-2014-0098480
Dec. 4, 2014   (KR) .................. 10-2014-0173240
May 28, 2015   (KR) .................. 10-2015-0075369

(51) Int. Cl.
*G06F 3/0484*   (2013.01)
*G06F 3/0488*   (2013.01)
(Continued)

(52) U.S. Cl.
CPC ...... *G06F 3/04845* (2013.01); *G06F 3/03545* (2013.01); *G06F 3/0482* (2013.01);
(Continued)

(58) Field of Classification Search
CPC ............. G06F 3/04845; G06F 3/03545; G06F 3/04817; G06F 3/0482; G06F 3/04842;
(Continued)

(56) References Cited

U.S. PATENT DOCUMENTS 4,618,895 A * 10/1986 Wright ................ G11B 27/024
                                                     348/645
5,754,873 A    5/1998 Nolan
(Continued)

FOREIGN PATENT DOCUMENTS

CN    102725724 A    10/2012
EP    2469388 A2     6/2012
(Continued)

OTHER PUBLICATIONS

Communication dated Jun. 30, 2017, issued by the European Patent Office in counterpart European Application No. 17162763.1.
(Continued)

*Primary Examiner* — Mandrita Brahmachari
(74) *Attorney, Agent, or Firm* — Sughrue Mion, PLLC

(57) ABSTRACT

A method and a device for providing content are provided. The device includes a display configured to display content, and an interface configured to receive a first input that selects a part of the displayed content, and a second input that requests to change a size of the displayed content. The device further includes a controller configured to control the display to display the selected part of the displayed content and an unselected part of the displayed content by changing a size of the selected part and a size of the unselected part to be different from each other, in response to the interface receiving the second input.

12 Claims, 38 Drawing Sheets

(51) Int. Cl.
*G06F 3/0354* (2013.01)
*G06F 3/0481* (2013.01)
*G06F 3/0482* (2013.01)

(52) U.S. Cl.
CPC ...... *G06F 3/04817* (2013.01); *G06F 3/04842* (2013.01); *G06F 3/04883* (2013.01); *G06F 2203/04806* (2013.01); *G06F 2203/04807* (2013.01); *G06F 2203/04808* (2013.01)

(58) Field of Classification Search
CPC ............. G06F 3/04847; G06F 3/04883; G06F 2203/04806; G06F 2203/04807; G06F 2203/04808; G11B 27/005; G11B 27/34
See application file for complete search history.

(56) References Cited

U.S. PATENT DOCUMENTS

| | | | |
|---|---|---|---|
| 6,611,653 B1 * | 8/2003 | Kim | G11B 15/026 348/E5.067 |
| 7,802,206 B1 | 9/2010 | Davis et al. | |
| 8,707,194 B1 * | 4/2014 | Jenkins | H04L 67/025 715/772 |
| 9,477,390 B2 | 10/2016 | Leffert et al. | |
| 2001/0012409 A1 | 8/2001 | Watanabe | |
| 2002/0075572 A1 * | 6/2002 | Boreczky | H04N 7/17336 359/722 |
| 2006/0214951 A1 | 9/2006 | Baar et al. | |
| 2006/0288280 A1 | 12/2006 | Makela | |
| 2008/0165141 A1 | 7/2008 | Christie | |
| 2008/0204477 A1 | 8/2008 | Venolia | |
| 2008/0295014 A1 | 11/2008 | Hennum et al. | |
| 2009/0083787 A1 * | 3/2009 | Morris | H04N 5/44543 725/32 |
| 2009/0153648 A1 * | 6/2009 | Quennesson | G11B 27/034 348/43 |
| 2010/0064252 A1 | 3/2010 | Kramer et al. | |
| 2010/0090964 A1 | 4/2010 | Soo et al. | |
| 2010/0275123 A1 * | 10/2010 | Yu | G06F 3/0481 715/731 |
| 2010/0302176 A1 | 12/2010 | Nikula et al. | |
| 2011/0013049 A1 | 1/2011 | Thorn | |
| 2011/0249861 A1 | 10/2011 | Tokutake | |
| 2012/0194559 A1 | 8/2012 | Lim | |
| 2012/0249581 A1 | 10/2012 | Cassistat et al. | |
| 2013/0050269 A1 | 2/2013 | Arrasvuori | |
| 2013/0058019 A1 | 3/2013 | Lee et al. | |
| 2013/0106888 A1 | 5/2013 | Penner et al. | |
| 2013/0120401 A1 | 5/2013 | Borysenko | |
| 2013/0191778 A1 | 7/2013 | Peters et al. | |
| 2013/0205210 A1 | 8/2013 | Jeon et al. | |
| 2013/0265246 A1 | 10/2013 | Tae | |
| 2013/0324192 A1 | 12/2013 | Lee et al. | |
| 2014/0105564 A1 * | 4/2014 | Johar | H04N 5/915 386/226 |
| 2014/0153908 A1 * | 6/2014 | Murakami | H04N 5/4403 386/343 |
| 2014/0157321 A1 | 6/2014 | Kurita | |
| 2014/0215365 A1 | 7/2014 | Hiraga et al. | |
| 2014/0225845 A1 * | 8/2014 | Muzar | G06F 3/041 345/173 |
| 2014/0250422 A1 | 9/2014 | Bank et al. | |
| 2015/0095843 A1 | 4/2015 | Greborio et al. | |
| 2015/0106709 A1 | 4/2015 | Kritt et al. | |
| 2015/0106712 A1 * | 4/2015 | Oh | G11B 27/034 715/716 |
| 2015/0256763 A1 * | 9/2015 | Niemi | G06F 3/0485 348/700 |
| 2015/0301635 A1 | 10/2015 | Masuoka | |
| 2015/0382066 A1 | 12/2015 | Heeter et al. | |

FOREIGN PATENT DOCUMENTS

| | | |
|---|---|---|
| KP | 10-2013-0066831 A | 6/2013 |
| KR | 10-2009-0118179 A | 11/2009 |
| KR | 10-2013-0077379 A | 7/2013 |
| TW | 201009661 A | 3/2010 |
| WO | 2010/136969 A1 | 12/2010 |
| WO | 2013/192464 A1 | 12/2013 |

OTHER PUBLICATIONS

Communication dated Nov. 3, 2015, by the European Patent Office in counterpart European Application No. 15179233.1.
International Search Report and Written Opinion, issued by International Searching Authority in corresponding International Application No. PCT/KR2015/007912, dated Nov. 11, 2015 (PCT/ISA/220, PCT/ISA/210 & PCT/ISA/237).
Notice of Allowance issued in U.S. Appl. No. 14/815,312 dated Apr. 28, 2017.
Office Action issued in U.S. Appl. No. 14/815,312 dated Feb. 17, 2016.
Office Action issued in U.S. Appl. No. 14/815,312 dated Jul. 8, 2016.
Communication dated Feb. 25, 2019, issued by the European Patent Office in counterpart European Application No. 17162763.1.
Communication dated Mar. 18, 2019, issued by the Taiwan Patent Office in counterpart Taiwanese Application No. 104124617.
Communication dated Aug. 13, 2019, issued by the State Intellectual Property Office of P.R. China in counterpart Chinese Application No. 201510463083.2.

* cited by examiner

FIG. 34

| | DATE ▼ | PLACE OF USE ▼ | CONTENT OF USE ▼ | CASH ▼ | CREDIT CARD ▼ |
|---|---|---|---|---|---|
| ☐ | 2009.01.14 | HWAPYUNGDONG... | GALBITANG | 0 | 10,000 |
| ☐ | 2009.01.15 | DAEHAN LIFE | DAEHAN LIFE INSURANCE | 648,118 | 0 |
| ☐ | 2009.01.15 | CMA | SAVINGS | 50,000 | 0 |
| ☐ | 2009.01.15 | PARIBA... | BREAD | 0 | 63,000 |
| ☐ | 2009.01.16 | UKBULCAR... | FILTER, CAP | 0 | 73,000 |
| ☐ | 2009.01.17 | HYUNDAEO... | GAS EXPENSE | 0 | 53,646 |
| ☐ | 2009.01.17 | CHINJEOL MART | KIWI, SWEET POTATO | 0 | 5,500 |
| ☐ | 2009.01.20 | APART... | LOAN INTEREST | 198,371 | 0 |
| ☐ | 2009.01.20 | T.S DISTRIBUTION | BABY CLOTH GIFT | 0 | 28,800 |
| ☐ | 2009.01.20 | CHINJEOL MART | RAMYEON, KIWI | 0 | 10,800 |
| ☐ | 2009.01.23 | LIMHEONJO | DEBT | 10,001 | 0 |
| ☐ | 2009.01.24 | BASKIN... | ICE CREAM | 0 | 11,700 |
| ☐ | 2009.01.25 | CHINJEOL MART | MILK, YOGURT | 0 | 7,300 | search CHINJEOL MART — 3410
3420 — row 2009.01.17 CHINJEOL MART
3431 — 5,500
3432 — 28,800
3433 — 7,300

| | DATE ▼ | PLACE OF USE ▼ | CONTENT OF USE ▼ | CASH ▼ | CREDIT CARD ▼ |
|---|---|---|---|---|---|
| ☐ | 2009.01.14 | HWAPYUNGDONG... | GALBITANG | 0 | 10,000 |
| ☑ | 2009.01.15 | DAEHAN LIFE | DAEHAN LIFE INSURANCE | 648,118 | 0 |
| ☑ | 2009.01.15 | CMA | SAVINGS | 50,000 | 0 |
| ☐ | 2009.01.15 | PARIBA... | BREAD | 0 | 63,000 |
| ☐ | 2009.01.16 | UKBULCAR... | FILTER, CAP | 0 | 73,000 |
| ☐ | 2009.01.17 | HYUNDAEO... | GAS EXPENSE | 0 | 53,646 |
| ☐ | 2009.01.17 | CHINJEOL MART | KIWI, SWEET POTATO | 0 | 5,500 |
| ☑ | 2009.01.20 | APART... | LOAN INTEREST | 198,371 | 0 |
| ☐ | 2009.01.20 | T.S DISTRIBUTION | BABY CLOTH GIFT | 0 | 28,800 |
| ☐ | 2009.01.20 | CHINJEOL MART | RAMYEON, KIWI | 0 | 10,800 |
| ☐ | 2009.01.23 | LIMHEONJO | DEBT | 10,001 | 0 |
| ☐ | 2009.01.24 | BASKIN... | ICE CREAM | 0 | 11,700 |
| ☐ | 2009.01.25 | CHINJEOL MART | MILK, YOGURT | 0 | 7,300 |

FIG. 37

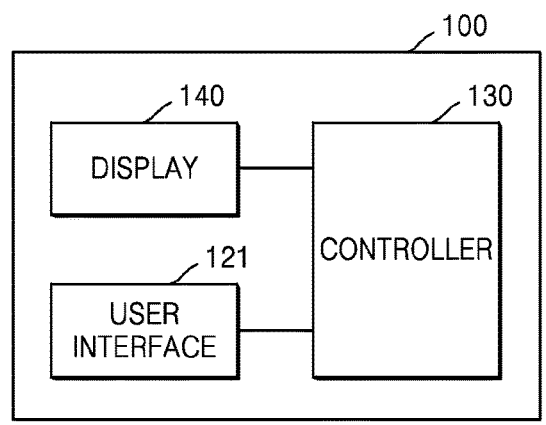

METHOD AND DEVICE FOR CONTROLLING REPRODUCTION SPEED OF MULTIMEDIA CONTENT

CROSS-REFERENCE TO RELATED APPLICATION

This application is a divisional of U.S. application Ser. No. 14/815,312 filed Jul. 31, 2015, which claims priority from Korean Patent Application No. 10-2014-0098480, filed on Jul. 31, 2014, Korean Patent Application No. 10-2014-0173240, filed on Dec. 4, 2014, and Korean Patent Application No. 10-2015-0075369, filed on May 28, 2015, in the Korean Intellectual Property Office, the disclosures of which are incorporated herein by reference in their entireties.

BACKGROUND

1. Field

Methods and apparatus consistent with exemplary embodiments relate to a method and a device for providing content.

2. Description of the Related Art

Mobile terminals are portable devices equipped with at least one of functions of performing voice and video calls, inputting or outputting information, and storing data, while being carried. As the functions are diversified, mobile terminals are gradually equipped to perform complex functions such as capturing images or moving pictures, reproducing music files or moving picture files, playing games, receiving broadcasts, accessing wireless internet, etc., and are implemented in form of a multimedia player providing various content.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a method and a device for providing content by modifying a selected part of the content and an unselected part of the content provided by a device, to be different from each other.

According to an aspect of an exemplary embodiment, there is provided a device including a display configured to display content, and an interface configured to receive a first input that selects a part of the displayed content, and a second input that requests to change a size of the displayed content. The device further includes a controller configured to control the display to display the selected part of the displayed content and an unselected part of the displayed content by changing a size of the selected part and a size of the unselected part to be different from each other, in response to the interface receiving the second input.

The controller may be further configured to control the display to increase the size of the selected part of the displayed content by a first magnification, and decrease the size of the unselected part of the displayed content by a second magnification that is determined based on the first magnification.

The first input may select the part of the displayed content using an input tool, and the controller may be further configured to determine the first magnification based on at least one among a thickness, a color, and a style of the first input.

The second input may include an open pinch, and the controller may be further configured to determine the first magnification based on a distance moved by two fingers in the open pinch.

The controller may be further configured to control the display to cease display of the unselected part of the displayed content, and display a first icon in place of the unselected part of the displayed content.

The interface may be further configured to receive a third input that selects the first icon, and the controller may be further configured to control the display to display the unselected part of the displayed content, and change the first icon to a second icon, in response to the interface receiving the third input.

The interface may be further configured to receive a fourth input that selects the second icon, and the controller may be further configured to control the display to cease display of the unselected part of the displayed content, and change the second icon to the first icon, in response to the interface receiving the fourth input.

The content may include at least one among handwritten text, typed text, and image content.

According to an aspect of another exemplary embodiment, there is provided a device including a display configured to display audio/video (A/V) content, an interface configured to receive an input that selects a section of the displayed A/V content, and a controller configured to control a reproduction speed of the selected section of the displayed A/V content and a reproduction speed of an unselected section of the displayed A/V content to be different from each other.

The display may be further configured to display a timeline that indicates a reproduction time point of the A/V content, the input may select a first position and a second position on the timeline, and the controller may be further configured to determine the selected section of the displayed A/V content to be between the first position and the second position.

The interface may be further configured to receive a close pinch or an open pinch in which two fingers touch the first position and the second position and move in directions toward or away from each other, respectively, and the controller may be further configured to determine the reproduction speed of the selected section of the displayed A/V content and the reproduction speed of the unselected section of the displayed A/V content, based on the directions and a distance of the movement of the two fingers.

According to an aspect of another exemplary embodiment, there is provided a method of providing content of a device, the method including displaying content, and receiving a first input that selects a part of the displayed content, and a second input that requests to change a size of the displayed content. The method further includes displaying the selected part of the displayed content and an unselected part of the displayed content by changing a size of the selected part and a size of the unselected part to be different from each other, in response to the interface receiving the second input.

The displaying the selected part and the unselected part may include increasing the size of the selected part of the displayed content by a first magnification, and decreasing the size of unselected part of the displayed content by a second magnification that is determined based on the first magnification.

The first input may select the part of the displayed content using an input tool, and the method may further include determining the first magnification based on at least one among a thickness, a color, and a style of the first input.

The second input may include an open pinch, and the method may further include determining the first magnification based on a distance moved by two fingers in the open pinch.

The displaying the selected part and the unselected part may include ceasing display of the unselected part of the displayed content, and displaying a first icon in place of the unselected part of the displayed content.

The method may further include receiving a third input that selects the first icon, and displaying the unselected part of the displayed content, and changing the first icon to a second icon, in response to the receiving the third input.

According to an aspect of another exemplary embodiment, there is provided a method of providing content of a device, the method including displaying audio/video (A/V) content, receiving an input that selects a section of the displayed A/V content, and controlling a reproduction speed of the selected section of the displayed A/V content and a reproduction speed of an unselected section of the displayed A/V content to be different from each other.

The method may further include displaying a timeline that indicates a reproduction time point of the A/V content, wherein the input selects a first position and a second position on the timeline, and determining the selected section of the displayed A/V content to be between the first position and the second position.

The method may further include receiving a close pinch or an open pinch in which two fingers touch the first position and the second position and move in directions toward or away from each other, respectively, and the controlling may include determining the reproduction speed of the selected section of the displayed A/V content and the reproduction speed of the unselected section of the displayed A/V content, based on the directions and a distance of the movement of the two fingers.

According to an aspect of another exemplary embodiment, there is provided a device including a display configured to display content, an interface configured to receive an input that selects a part of the displayed content, and a controller configured to control the display to display the selected part of the displayed content and an unselected part of the displayed content by changing a size of the selected part and a size of the unselected part to be different from each other.

The content may include image content, and the controller may be further configured to increase the size of the selected part of the displayed image content, and decrease the size of the unselected part of the displayed image content.

The interface may be further configured to receive a size change input that requests to change a size of the displayed content, and the controller may be further configured to increase the size of the selected part of the displayed content, in response to the interface receiving the size change input that draws a clockwise circle, and decrease the size of the selected part of the displayed content, in response to the interface receiving the size change input that draws a counterclockwise circle.

The interface may be further configured to receive a size change input that requests to change a size of the displayed content, and the controller may be further configured to increase the size of the selected part of the displayed content, in response to the interface receiving the size change input that includes an open pinch, and decrease the size of the selected part of the displayed content, in response to the interface receiving the size change input that includes a close pinch.

BRIEF DESCRIPTION OF THE DRAWINGS

The above and/or other aspects will be more apparent by describing exemplary embodiments with reference to the accompanying drawings in which:

FIG. 34 is a view illustrating a method of selecting at least one item of a list, according to an exemplary embodiment;

FIG. 36 is a view illustrating a method of displaying a modified list on a display, according to an exemplary embodiment;

FIG. 37 is a block diagram of a structure of a device according to an exemplary embodiment.

DETAILED DESCRIPTION OF THE EXEMPLARY EMBODIMENTS

Figure 1:
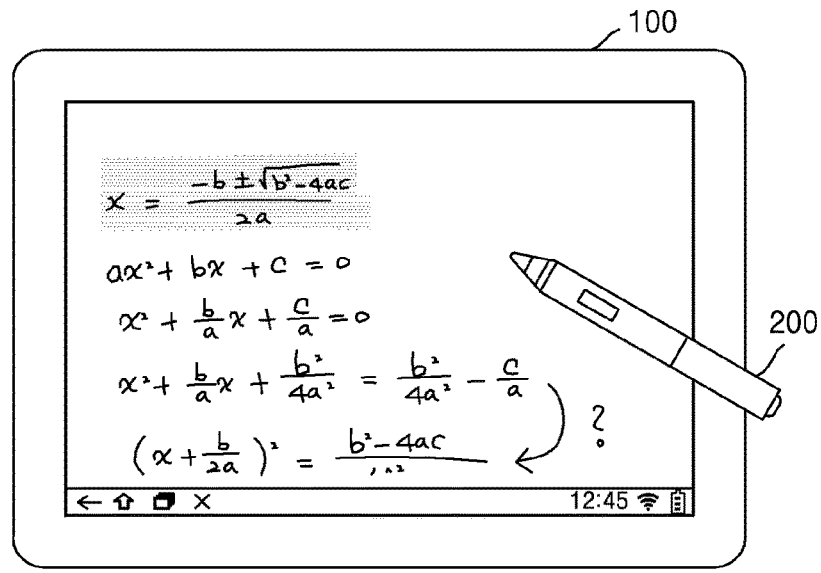
FIG. 1 is a view of a system for providing content, according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

In the entire specification, a "touch input" may signify a gesture performed by a user on a touch screen to control a device. The touch gesture stated in the present specification may include tapping, touching & holding, double tapping, dragging, panning, flicking, dragging & dropping, etc.

"Tapping" is a user's motion of touching a screen by using a finger or a touch tool such as an electronic pen (e.g., stylus) and then instantly lifting the finger or touch tool from the screen without moving.

"Touching & holding" is a user's motion of touching a screen by using a finger or a touch tool such as an electronic pen and then maintaining the above touching motion over a time, for example, 2 secs, after touching the screen. In other words, a time difference between a touch-in time and a touch-out time is greater than or equal to the time, for example, 2 secs. When a touch input lasts over the time, to remind the user whether the touch input is tapping or touching & holding, a feedback signal may be provided in a visual, acoustic, or tactile manner. The time may vary according to an embodiment.

"Double tapping" is a user's motion of touching the screen twice by using the finger or touch tool.

"Dragging" is a user's motion of touching the screen by using the finger or touch tool and moving the finger or touch tool to another position on the screen while keeping the touching motion. The dragging motion may enable the moving or panning motion of an object.

"Panning" is a user's motion of performing a dragging motion without selecting an object. Because no object is selected in the panning motion, no object is moved in a page but the page itself is moved on the screen or a group of objects may be moved within a page.

"Flicking" is a user's motion of performing a dragging motion over a speed, for example, 100 pixel/s, by using the finger or touch tool. The dragging (panning) motion or the flicking motion may be distinguished based on whether the moving speed of the finger or touch tool is over the speed, for example, 100 pixel/s, or not.

"Dragging & Dropping" is a user's motion of dragging an object to a predetermined position on the screen by using the finger or touch tool and then dropping the object at that position.

"Pinching" is a user's motion of moving two fingers touching on the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen by using the finger or touch tool and simultaneously moving the object horizontally or vertically by a predetermine distance. A swiping motion in a diagonal direction may not be recognized as a swiping event.

Also, in the exemplary embodiments, a button input may include a physical user interface (PUI) button input and a graphical user interface (GUI) button input.

Also, in the exemplary embodiments, a motion input may include a user motion input and a device motion input. In the case of a user motion input, a motion of a user may be recognized through a camera. In the case of a device motion input, a device may recognize a movement of a device through an acceleration sensor or a gyro sensor.

For example, the user motion input may be an input to move a user's hand to be away from or toward a device, an input to move a user's hand from right to left or from left to right, an input to move a user's hand from up to bottom or from bottom to up, or an input to open or close a user's hand.

Also, the device motion input may be inputs of shaking a device left and right or up and down, and an input to move a device to be away from or toward a device.

FIG. 1 is a view of a system for providing content, according to an exemplary embodiment.

Referring to FIG. 1, the system includes a device 100 and an input tool 200, each of which is discussed below in detail.

The device 100 may be a mobile phone, a smartphone, a laptop computer, a tablet PC, an electronic book terminal, a digital broadcast terminal, a personal digital assistant (PDA), a portable multimedia player (PMP), a navigation device, an MP3 player, a digital camera, a wearable device, for example, glasses or a wrist watch, etc., but the present exemplary embodiment is not limited thereto.

The device 100 is a device that reproduces various types of content. For example, the content may be handwritten text content, typed text content, an image content, a video content, an audio content, a list, etc., but the present exemplary embodiment is not limited thereto.

The handwritten text content may be a set of strokes input in a predetermined time order. The strokes may signify a trajectory that is drawn from a touch point on the device 10 by the input tool 200 maintaining a touch. For example, in an equation "3+2=5", when a user draws, without interruption, each of "3" and "2" while maintaining a touch, each of "3" and "2" may constitute one stroke. For a symbol "+", a user first draws "−" and then draws "I" so that "−" and "I" each may constitute one stroke. One stroke may constitute one character or symbol, or a plurality of strokes may constitute one character or symbol.

Alternatively or additionally, each stroke included in a handwritten text content is relative to time information. The time information of a stroke may correspond to a time point when the stroke is generated or changed. The time information of a stroke may be recorded according to a time stamp format representing a time.

A typed text content may be a list of characters in an order or the list may include items having the same attribute that are arrayed in sequence.

Also, the device 100 may display a handwritten text content, a typed text content, an image content, a list, etc. on a display 121 (FIG. 37) of the device 100. Also, the device 100 may reproduce a video content, an audio content, etc., and display a content reproduction screen on the display 121. However, the present exemplary embodiment is not limited thereto.

Also, the input tool 200 is a device used by a user to input information to the device 100. For example, the input tool 200 may be a finger, an electronic pen, for example, a stylus pen, a keyboard, a mouse, etc., but the present exemplary embodiment is not limited thereto. The device 100 may receive a user's touch input, and the input tool 200 may receive a touch input on the device 100.

The device 100 may receive an input to select a partial area of content by a user using the input tool 200.

For example, referring to FIG. 1, a user may select a part of a handwritten text content by highlighting or underlining the part of a handwritten text content displayed on the device 100 by using the input tool 200. The device 100 may recognize the part of a handwritten text content in units of strokes or coordinates. For example, a part of a handwritten text content may be presented by a coordinate value (first coordinate information) on a coordinate plane corresponding to the display 121 or a coordinate value (second coordinate information) on a coordinate plane corresponding to the entire handwritten text content. Alternatively or additionally, the part of a handwritten text content may be presented by a stroke included in the part of a handwritten text content.

Alternatively or additionally, the user may select a part of a typed text content displayed on the device 100 by using the input tool 200. The device 100 may recognize the part of a typed text content in units of coordinates or characters. For example, a part of a typed text content may be presented by a coordinate value (first coordinate information) on a coordinate plane corresponding to the display 121 or a coordinate value (second coordinate information) on a coordinate plane corresponding to the entire typed text content. Alternatively or additionally, the part of a typed text content may be presented by a character included in the part of a typed text content.

Alternatively or additionally, the user may select a part of an image content displayed on the device 100 by using the input tool 200. The device 100 may recognize the part of an image content in units of coordinates or objects. For example, a part of an image content may be presented by a coordinate value (first coordinate information) on a coordinate plane corresponding to the display 121 or a coordinate value (second coordinate information) on a coordinate plane corresponding to the entire image content. Alternatively or additionally, the part of an image content may be presented by an object, for example, a person, a building, a character, etc., included in the part of image content.

Alternatively or additionally, the user may select a partial section of a video content or an audio content reproduced by the device 100, by using the input tool 200. The device 100 may recognize the partial section of a video content in units of time. For example, a total reproduction time of a video content is 1 hour, 12 mins, and 23 secs, a partial section may be selected in a section between 0 seconds when a video content starts and 1 hour, 12 mins, and 23 secs when the video content ends. Accordingly, the partial section of a video content may be presented by time information based on a start time of the video content.

Also, the device 100 may recognize the partial section of an audio content in units of time like the video content. The partial section of an audio content may be presented by time information based on a start time of the audio content.

Alternatively or additionally, the user may select a part of a list displayed on the device 100. The device 100 may recognize the part of a list in units of items.

The above-described system for providing content is described below in detail with reference to the accompanying drawings.

Figure 2:
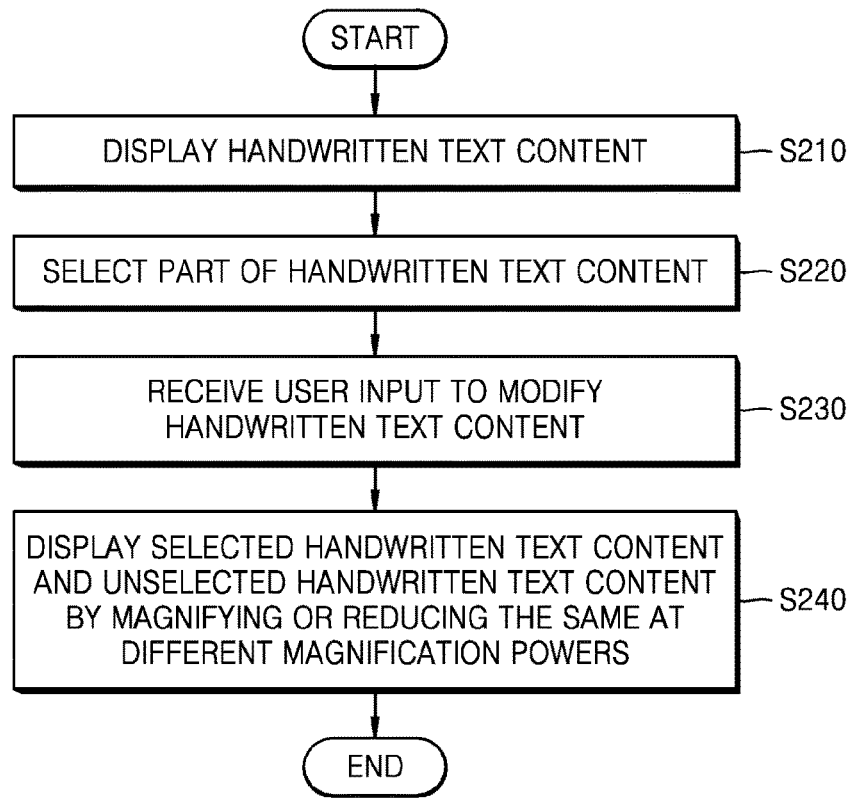
FIG. 2 is a flowchart of a method of displaying a handwritten text content by magnifying or reducing the same, according to an exemplary embodiment.

FIG. 2 is a flowchart of a method of displaying a handwritten text content by magnifying or reducing the same, according to an exemplary embodiment.

Referring to FIG. 2, in operation S210, the device 100 displays a handwritten text content on the display 121.

The handwritten text content may signify content obtained by converting a user's handwritten input to digital information. For example, the handwritten text content may include a handwritten image, a handwritten text, etc. drawn on a digital device, but the present exemplary embodiment is not limited thereto. Also, the handwritten text content may be generated by the device 100 based on a received touch input on the device 100, or may be generated by and received from an external device.

The device 100 may display the handwritten text content on an execution window of an application. For example, the application may include a writing notebook application, a memo application, a diary application, a calendar application, an e-book application, a household account book, etc., but the present exemplary embodiment is not limited thereto.

In operation S220, the device 100 receives an input to select a part of the displayed handwritten text content.

For example, the user may highlight or underline a part of the handwritten text content displayed on the device 100 by using the input tool 200. The device 100 may determine the highlighted or underlined part of the handwritten text content, to be selected.

Also, the user may draw a closed curve such as a circle or a polygon by using the input tool 200. The device 100 may determine the part of the handwritten text content included in the drawn closed curve to be selected.

In operation S230, the device 100 receives a user input to modify (magnify or reduce) a handwritten text content.

For example, an input requesting magnification or reduction of a handwritten text content may include an input to draw a pattern, a button input, a user motion input, a device motion input, a voice input, etc., but the present exemplary embodiment is not limited thereto.

In operation S240, the device 100 displays on the display 121 the selected handwritten text content and unselected handwritten content by magnifying or reducing the same at different magnification powers.

For example, when the device 100 receives an input requesting magnification of a handwritten text content, a selected part of the handwritten text content may be magnified at a first magnification and an unselected part of the handwritten text content may be magnified at a second magnification, where the first magnification may be greater than the second magnification.

In another example, when the device 100 receives an input requesting reduction of a handwritten text content, a selected part of the handwritten text content may be reduced at a first magnification and an unselected part of the handwritten text content may be reduce at a second magnification, where the first magnification may be greater than the second magnification. In still another example, when the device 100 receives an input requesting reduction of a handwritten text content, a selected part of the handwritten text content may be reduced at a magnification of one time, that is, not reduced, and an unselected part of the handwritten text content may be reduced at a magnification of 0.5 times, but the present exemplary embodiment is not limited thereto.

The above-described operation is described below in detail with reference to the accompanying drawings.

FIGS. 3A to 3D are views illustrating a method of displaying content by magnifying or reducing the same, according to an exemplary embodiment.

Figure 3A:
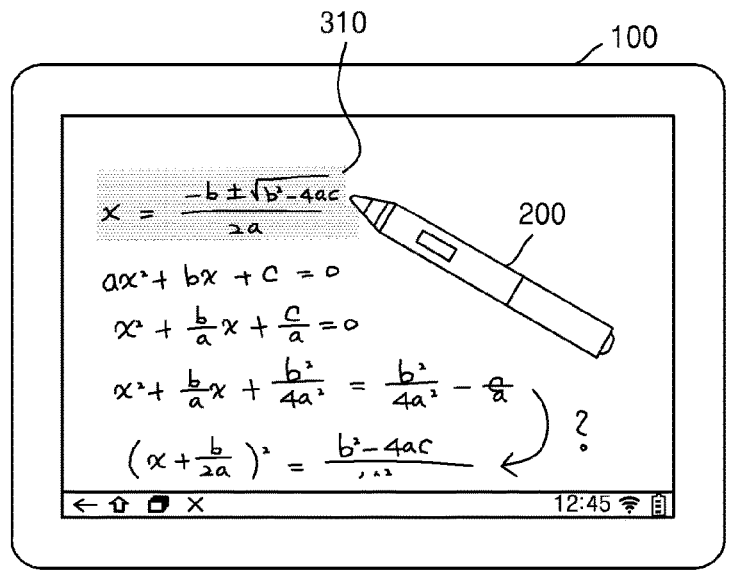
FIGS. 3A to 3D are views illustrating a method of displaying content by magnifying or reducing the same, according to an exemplary embodiment.

Referring to FIG. 3A, the device 100 executes a note application, and displays a handwritten text content on a note application execution screen. The handwritten text content may be generated by the device 100 or received from an external device, based on a user input.

The device 100 may receive an input to select a part of a handwritten text content by a user using the input tool 200. For example, as illustrated in FIG. 3A, the user highlights a part 310 of the handwritten text content to be selected, by dragging an area where the part 310 of the handwritten text content to be selected is displayed, using the input tool 200, for example, an electronic pen. Accordingly, the device 100 determines the highlighted part 310 of the handwritten text content to be selected.

Figure 3B:
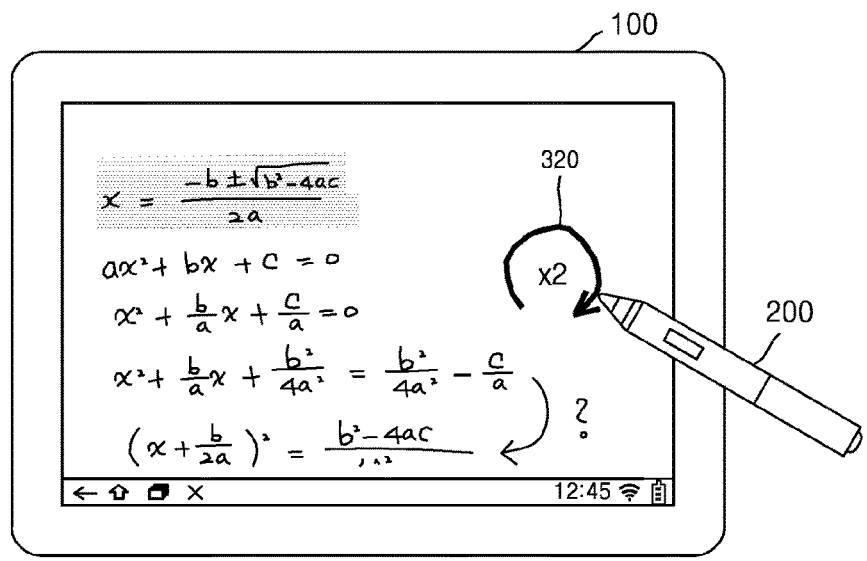

After the part of a handwritten text content is selected, the device 100 may receive a user input requesting magnification or reduction of the selected part of the handwritten text content. For example, as illustrated in FIG. 3B, when a user input 320 of drawing a circle clockwise on the display 121 is received, the device 100 determines the user input 320 to be an input requesting magnification of the selected part of the handwritten text content. In contrast, when a user input to draw a circle counterclockwise on the display 121 is received, the device 100 may determine the user input 320 to be an input requesting reduction of the selected part of the handwritten text content.

Figure 3C:
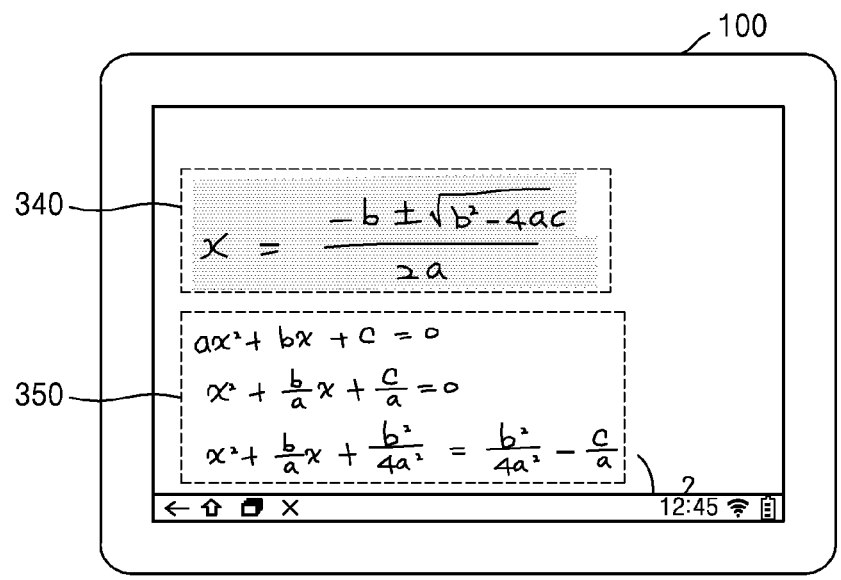

In response to an input requesting magnification of the selected part of the handwritten text content, for example, an input to draw a circle clockwise, the device 100 may magnify the selected part of the handwritten text content only. For example, as illustrated in FIG. 3C, the device 100 may display a selected part 340 of handwritten text content by magnifying the same at a preset magnification. Also, as illustrated in FIG. 3B, when the user inputs a magnification by using the input tool 200, the device 100 may display the selected part 340 of the handwritten text content by magnifying the same at the input magnification.

In contrast, in response to an input requesting reduction of the selected part of the handwritten text content, for example, an input to draw a circle counterclockwise, the device 100 may reduce the selected part of the handwritten text content only.

Also, in response to an input requesting magnification of the selected part of the handwritten text content, for example, an input to draw a circle clockwise, the device 100 may magnify the selected part of the handwritten text content and reduce an unselected part (e.g., 350 of FIG. 3C) of the handwritten text content. In this state, the selected part of the handwritten text content may be magnified at a preset magnification, and the unselected part of the handwritten text content may be reduced at a preset magnification.

Also, when the user inputs a magnification by using the input tool 200, the device 100 may magnify the selected part of the handwritten text content at an input magnification and reduce the unselected part of the handwritten text content based on the magnification of the selected part of the handwritten text content. For example, when the selected part of the handwritten text content is magnified two times, the unselected part of the handwritten text content may be reduced 0.5 times. When the selected part of the handwritten text content is magnified three times, the unselected part of the handwritten text content may be reduced ⅓ times. However, the present exemplary embodiment is not limited thereto.

The device 100 may display a highlighted part of the handwritten text content by magnifying the same two times and a non-highlighted part of the handwritten text content by reducing the same ½ times. Accordingly, the user may recognize at first sight main parts of the handwritten text content, for example, highlighted parts of the handwritten text content.

Figure 3D:
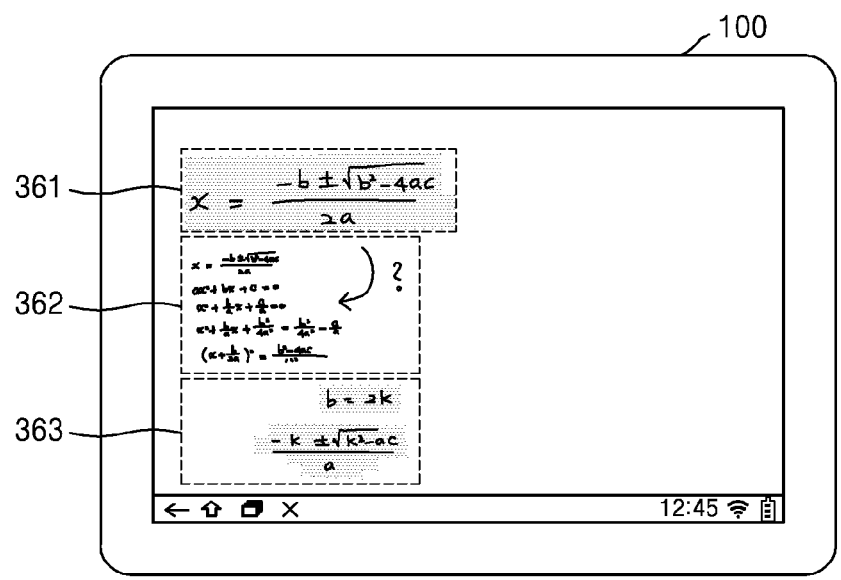

In contrast, in response to an input requesting reduction of the selected part of the handwritten text content, for example, an input to draw a circle counterclockwise, the device 100 may reduce the selected part of the handwritten text content and the unselected part of the handwritten text content at different magnifications, as illustrated in FIG. 3D. For example, selected parts 361 and 363 of the handwritten text content may be reduced 0.75 times and an unselected part 362 of the handwritten text content may be reduced 0.5 times. Alternatively, the selected parts 361 and 363 of the handwritten text content may be reduced one time, that is, not reduced, and only the unselected part 362 of the handwritten text content may be reduced 0.5 times. Accordingly, when the user continuously inputs a request for reducing the selected part of the handwritten text content, the unselected part of the handwritten text content is further reduced compared to the selected part of the handwritten text content, and thus the selected part of the handwritten text content may be recognized at first sight.

Alternatively, when an input requesting reduction of the selected part of the handwritten text content is received, the device 100 may reduce the selected part of the handwritten text content and magnify the unselected part of the handwritten text content. Because the method of reducing the selected part of the handwritten text content and magnifying the unselected part of the handwritten text content is similar to the method of magnifying the selected part of the handwritten text content and reducing the unselected part of the handwritten text content described with reference to FIG. 3D, a detailed description thereof is omitted.

Alternatively or additionally, the device 100 may display the selected part of the handwritten text content in three dimensions (3D) and the unselected part of the handwritten text content in two dimensions (2D).

Although FIGS. 3A and 3B illustrate that after a part of a handwritten text content is selected, an input requesting magnification or reduction of the part of the handwritten text content is received, the present exemplary embodiment is not limited thereto. After an input requesting magnification or reduction of the part of the handwritten text content, an area to be magnified or reduce may be selected.

For example, the user may highlight a part of the handwritten text content to select, by drawing a circle clockwise (an input requesting magnification) or drawing a circle counterclockwise (an input requesting reduction), on the display 121 by using the input tool 200, and then dragging an area where the part of the handwritten text content to be magnified or reduced. Accordingly, the device 100 may magnify or reduce the highlighted part at a preset magnification. Alternatively, before a part of the handwritten text content is selected, the device 100 may receive an input of a magnification and magnify or reduce the selected part of the handwritten text content at the received magnification.

Figure 4A:
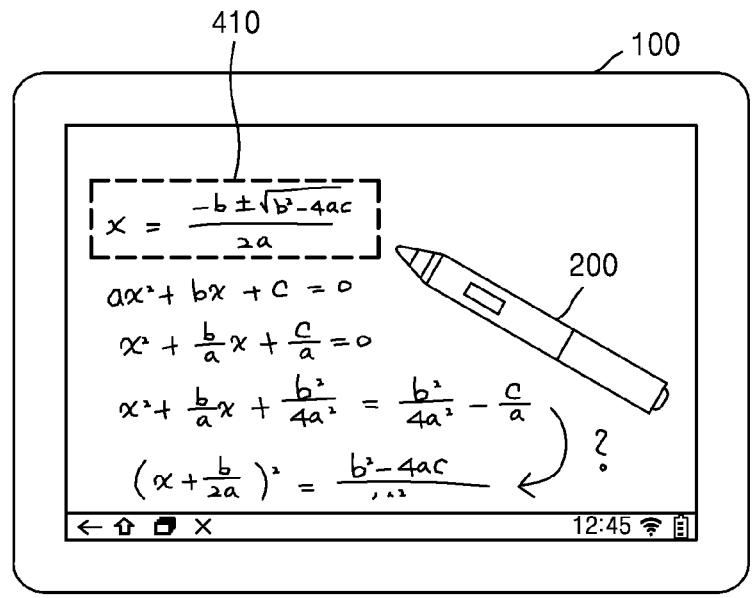
FIGS. 4A to 4C are views illustrating a method of selecting a part of a handwritten text content, according to an exemplary embodiment.
Figure 4B:
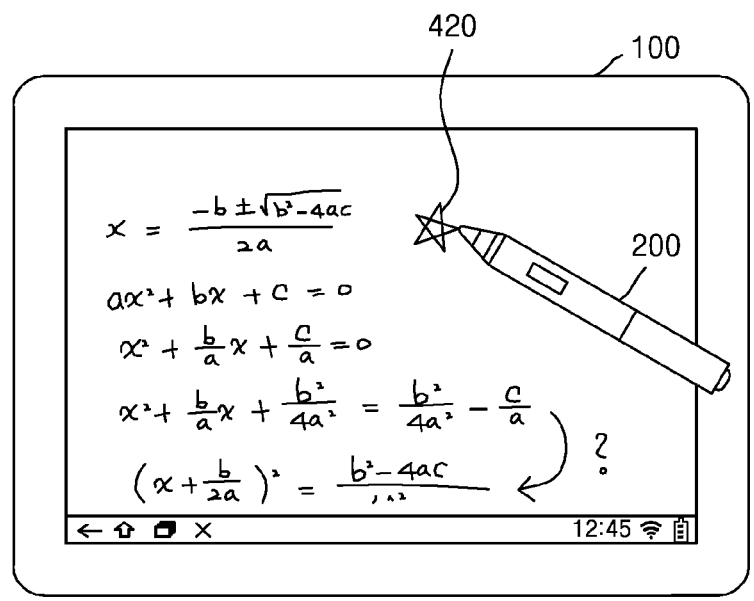
Figure 4C:
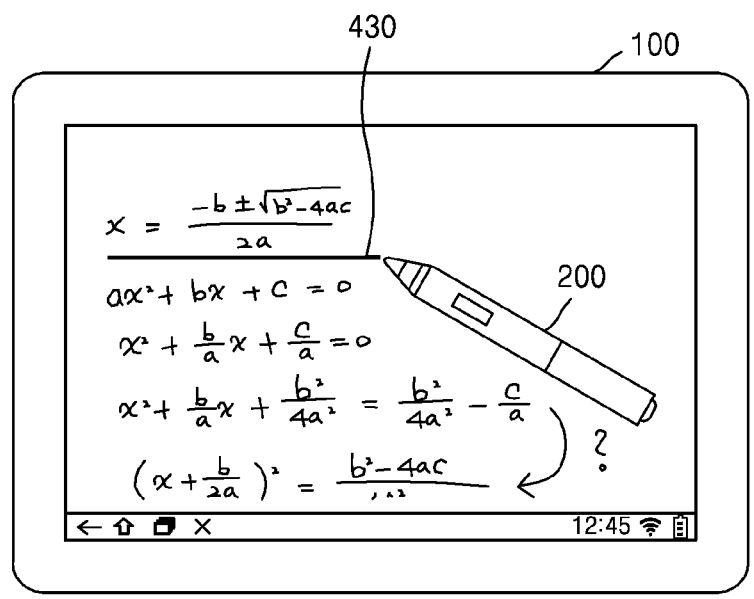

FIGS. 4A to 4C are views illustrating a method of selecting a part of a handwritten text content, according to an exemplary embodiment.

As illustrated in FIG. 4A, a user draws a closed curve 410 such as a rectangle to include the part of the handwritten text content, by using the input toll 200, for example, an electronic pen. Accordingly, the device 100 determines the part of the handwritten text content included in the closed curve 410 to be selected.

Alternatively or additionally, as illustrated in FIG. 4B, the user inputs a mark 420 such as a star or check mark on a line on which the part of the handwritten text content is indicated, by using the input toll 200, for example, an electronic pen. Accordingly, the device 100 determines the part of the handwritten text content indicated on the line where the mark 420 is input to be selected.

Also, the device 100 may apply a different magnification or reduction power to the selected part of the handwritten text content according to a number of the marks 420. For example, when one star mark is input to a first line and two star marks are input to a second line, the device 100 may magnify a part of the handwritten text content indicated on the first line two times and a part of the handwritten text content indicated on the second line three times. However, the present exemplary embodiment is not limited thereto.

Alternatively or additionally, as illustrated in FIG. 4C, the user underlines with an underline 430 the part of the handwritten text content, by using the input toll 200, for example, an electronic pen. Accordingly, the device 100 determines the underlined part of the handwritten text content to be selected.

Also, the device 100 may apply a different magnification or reduction power to the selected part of the handwritten text content according to a thickness value of an underline, a color value of an underline, and a style value of an underline. For example, when a first part of the handwritten text content is underlined with a first color value and a second part of the handwritten text content is underlined with a second color value, the first part of the handwritten text content may be magnified two times and the second part of the handwritten text content may be magnified three times. However, the present exemplary embodiment is not limited thereto.

Alternatively or additionally, when a first part of the handwritten text content is underlined with a first underline of a first thickness and a second part of the handwritten text content is underlined with a second underline of a second thickness, the first part of the handwritten text content may be magnified two times and the second part of the handwritten text content may be magnified three times. However, the present exemplary embodiment is not limited thereto.

Figure 5A:
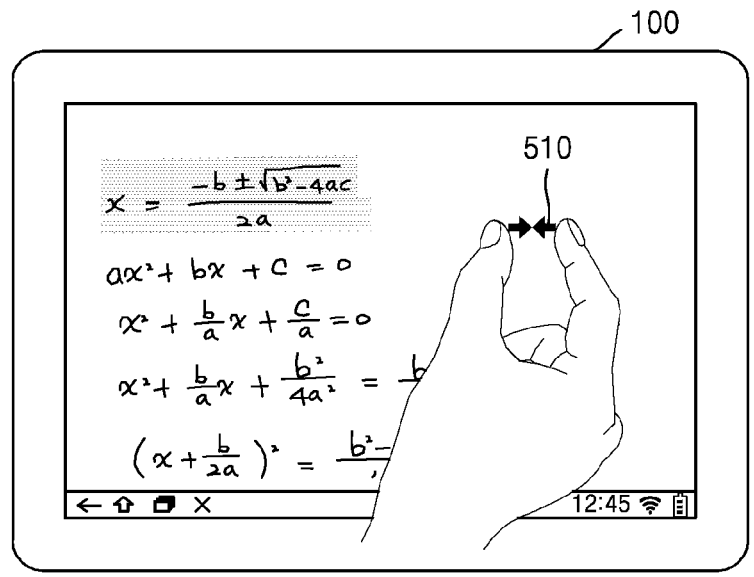
FIGS. 5A and 5B are views illustrating an input requesting magnification or reduction of a handwritten text content, according to an exemplary embodiment.
Figure 5B:
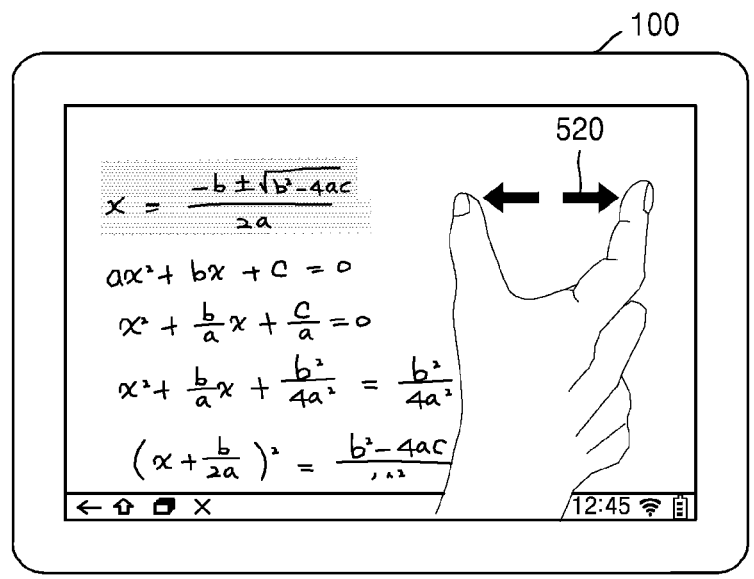

FIGS. 5A and 5B are views illustrating an input requesting magnification or reduction of a handwritten text content, according to an exemplary embodiment.

For example, as illustrated in FIG. 5A, when the user performs a pinch-in input 510 to move two fingers in a state of touching the display 121 in directions toward each other, the device 100 may determine the pinch-in input 510 to be an input requesting reduction of a selected part of the handwritten text content.

In contrast, as illustrated in FIG. 5B, when the user performs a pinch-out input 520 to move two fingers in a state of touching the display 121 in directions away from each other, the device 100 may determine the pinch-out input 520 to be an input requesting magnification of the selected part of the handwritten text content.

Also, the device 100 may apply different magnifications to magnification or reduction of the selected part of the handwritten text content, according to a distance moved by the two fingers. For example, when a pinch-out input to move two fingers a first distance in directions away from each other is performed, the device 100 may magnify the selected part of the handwritten text content two times. When a pinch-out input to move two fingers a second distance that is longer than the first distance in directions away from each other is performed, the device 100 may magnify the selected part of the handwritten text content three times. However, the present exemplary embodiment is not limited thereto.

Figure 6A:
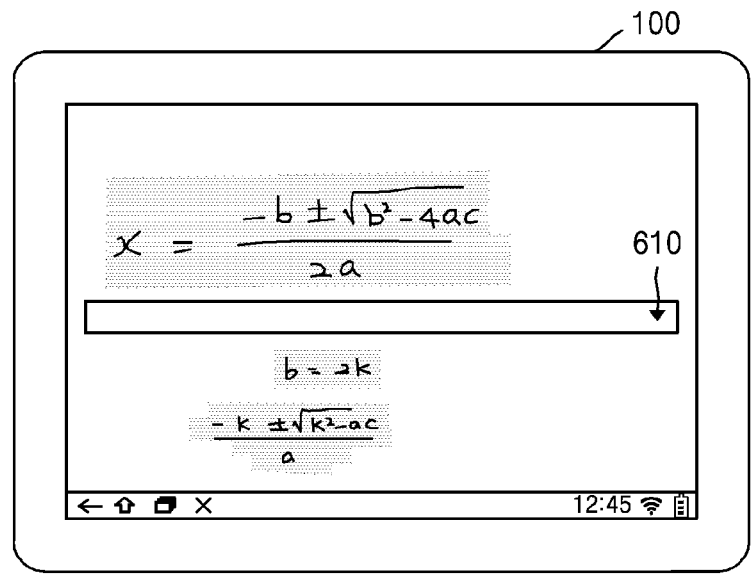
FIGS. 6A and 6B are views illustrating a method of displaying a modified handwritten text content on a display, according to an exemplary embodiment.
Figure 6B:
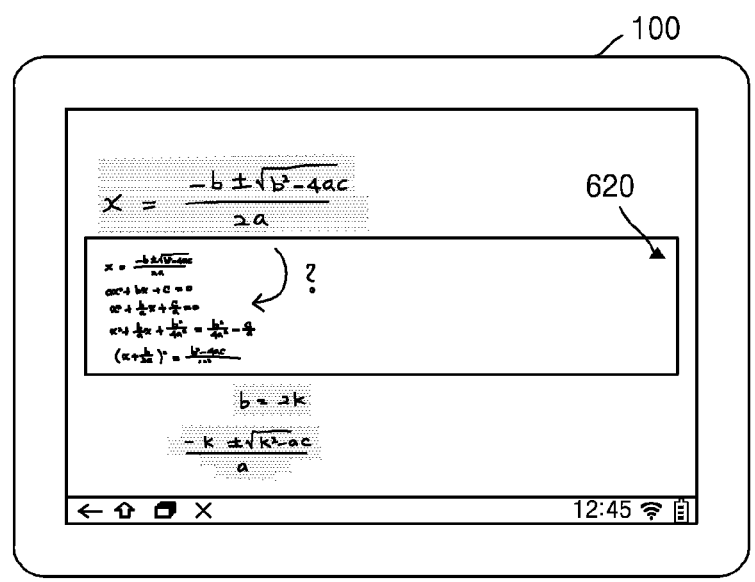

FIGS. 6A and 6B are views illustrating a method of displaying a modified handwritten text content on the display 121, according to an exemplary embodiment.

The device 100 receives an input to select a part of a handwritten text content displayed on the display 121. Because this process is described in detail with reference to FIGS. 4A to 4C, a detailed description thereof is omitted.

Also, the device 100 receives an input of "folding." The term "folding" signifies that an unselected part of the handwritten text content is folded not to be displayed on the display 121 and only a selected part of the handwritten text content is displayed on the display 121.

For example, the input of "folding" may be an input to select an icon, for example, a folding icon, or an input to draw a circle clockwise or counterclockwise by using the input tool 200 on the display 121, as described above with reference to FIG. 3B. Alternatively or additionally, as described above with reference to FIGS. 5A and 5B, the input of "folding" may be a pinch-in input that the user moves two fingers in a state of touching the display 121 in directions toward each other. However, the present exemplary embodiment is not limited thereto.

When a folding input is received, the device 100 may display only the selected part of the handwritten text content and may not display the unselected part of the handwritten text content. In this state, the device 100, as illustrated in FIG. 6A, displays the selected part of the handwritten text content by magnifying the same at a preset magnification or an input magnification. Also, the device 100 displays an "unfolding" icon 610 to have the unselected part of the handwritten text content displayed on the display 121.

When the user selects the "unfolding" icon 610, as illustrated in FIG. 6B, a hidden part of the handwritten text content, that is, the unselected part of the handwritten text content, is displayed again, and the "unfolding" icon 610 is changed to a "folding" icon 620 to be displayed. Also, the device 100 may display the magnified part of the handwritten text content by reducing the same to an original size.

Also, when the user selects the "folding" icon 620 again, as illustrated in FIG. 6A, the device 100 displays only the selected part of the handwritten text content, and does not display the unselected part of the handwritten text content. The "folding" icon 620 is displayed by being changed to the "unfolding" icon 610.

Figure 7:
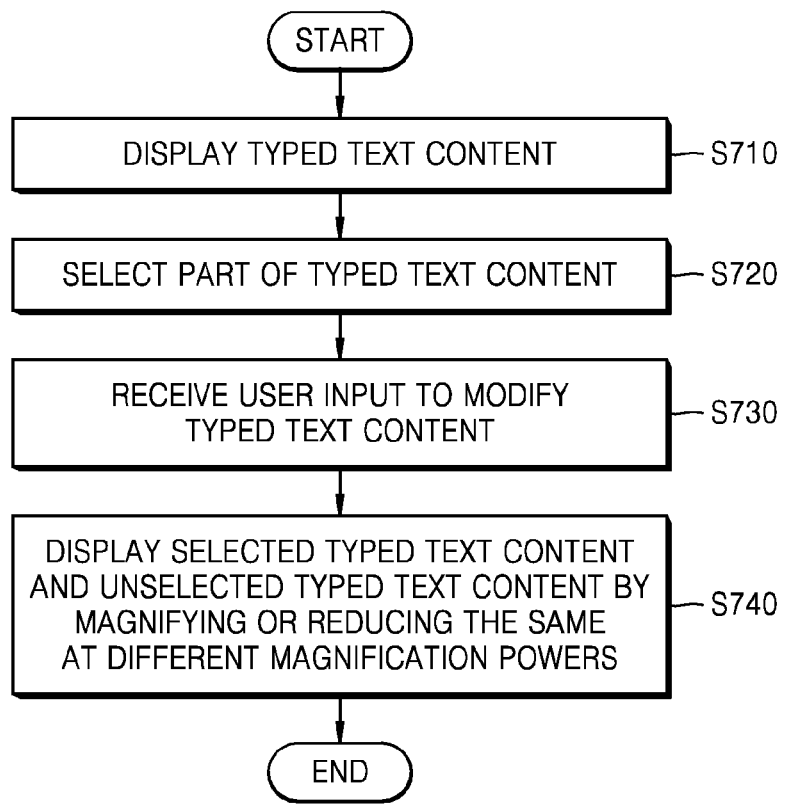
FIG. 7 is a flowchart of a method of displaying a typed text content by magnifying or reducing the same, according to an exemplary embodiment.

FIG. 7 is a flowchart of a method of displaying a typed text content by magnifying or reducing the same, according to an exemplary embodiment.

Referring to FIG. 7, in operation S710, the device 100 displays a typed text content on the display 121.

The typed text content may be generated by the device 100 according to a user's text input, or may be generated by and received from an external device.

Also, the device 100 may display the typed text content on an execution window of an application. For example, the application may include a memo application, a diary application, a calendar application, an e-book application, a household account book, etc., but the present exemplary embodiment is not limited thereto.

In operation S720, the device 100 receives an input to select a part of the displayed typed text content.

For example, a user may highlight or underline a part of the typed text content displayed on the device 100 by using the input tool 200. The device 100 may determine the highlighted or underlined part of the typed text content, to be selected.

Also, the user may draw a closed curve such as a circle or a polygon by using the input tool 200 over the typed text content. The device 100 may determine a part of the typed text content that is included in the closed curve to be selected.

Also, the user may select a text by using a keyword search. When the user conducts a search by inputting a keyword, a word corresponding to the keyword may be selected, or a sentence or paragraph including the keyword may be selected.

In operation S730, the device 100 receives a user input to modify the typed text content.

For example, the device 100 may receive a user input requesting magnification or reduction of the typed text content, for example, an input to draw a pattern, a button input, a user motion input, a device motion input, a voice input, etc., but the present exemplary embodiment is not limited thereto.

In operation S740, the device 100 displays the selected part of the typed text content and an unselected part of the typed text content on the display 121 by magnifying or reducing the same at different magnification powers.

The above-described operation is described below in detail with reference to the accompanying drawings.

Figure 8A:
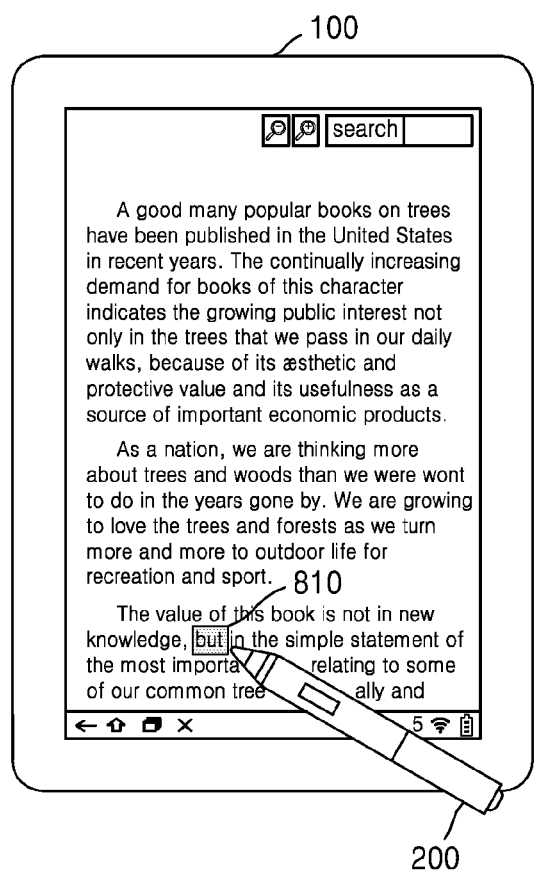
FIGS. 8A to 8C are views illustrating a method of selecting a part of a typed text content, according to an exemplary embodiment.
Figure 8B:
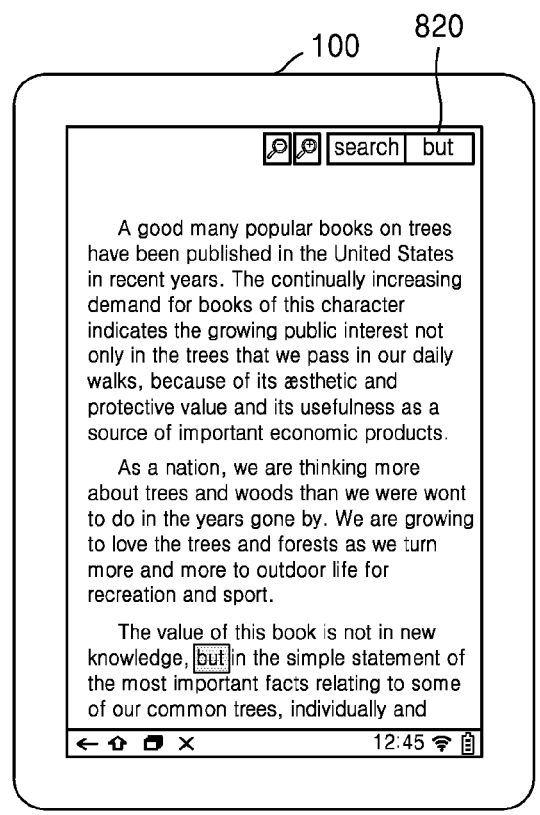
Figure 8C:
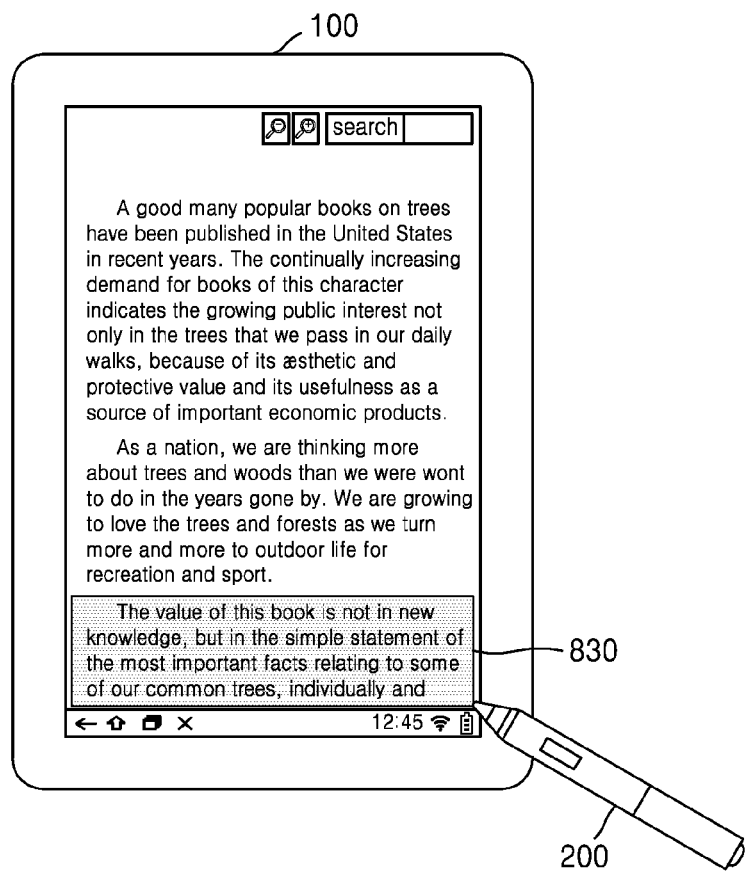

FIGS. 8A to 8C are views illustrating a method of selecting a part of a typed text content, according to an exemplary embodiment.

Referring to FIGS. 8A to 8C, the device 100 executes an e-book application, and displays a typed text content on an e-book application execution screen.

As illustrated in FIG. 8A, when a user input to tap a word, for example, "but", of the typed text content by using the input tool 200 is received, the device 100 may determine any one of the word, a sentence including the word, and a paragraph including the word to be selected. Also, the selected word, sentence, or paragraph may be highlighted (810) or underlined.

Alternatively or additionally, the device 100 may select a part of the typed text content based on a search keyword input. For example, as illustrated in FIG. 8B, the user inputs a keyword, for example, "but", in a search window 820 displayed on the e-book application screen, by using, e.g., the input tool 200. When the keyword is input and a search request input is received, the device 100 may select and highlight any one of the word, a sentence including the word, and a paragraph including the word, by searching the keyword.

Also, the device 100 may select a part of the typed text content based on a closed curve input. For example, as illustrated in FIG. 8C, the user draws a closed curve 830 such as a rectangle by using the input tool 200. The device 100 may select a part of the typed text content that is included in the closed curve 830 or a paragraph around which the closed curve 830 is drawn.

Alternatively or additionally, the user may underline or highlight a part of the typed text content by using the input tool 200. The device 100 may select an underlined part of the typed text content or a highlighted part of the typed text content. Also, the device 100 may select a sentence or paragraph including the underlined or highlighted part of the typed text content. However, the present exemplary embodiment is not limited thereto.

Figure 9A:
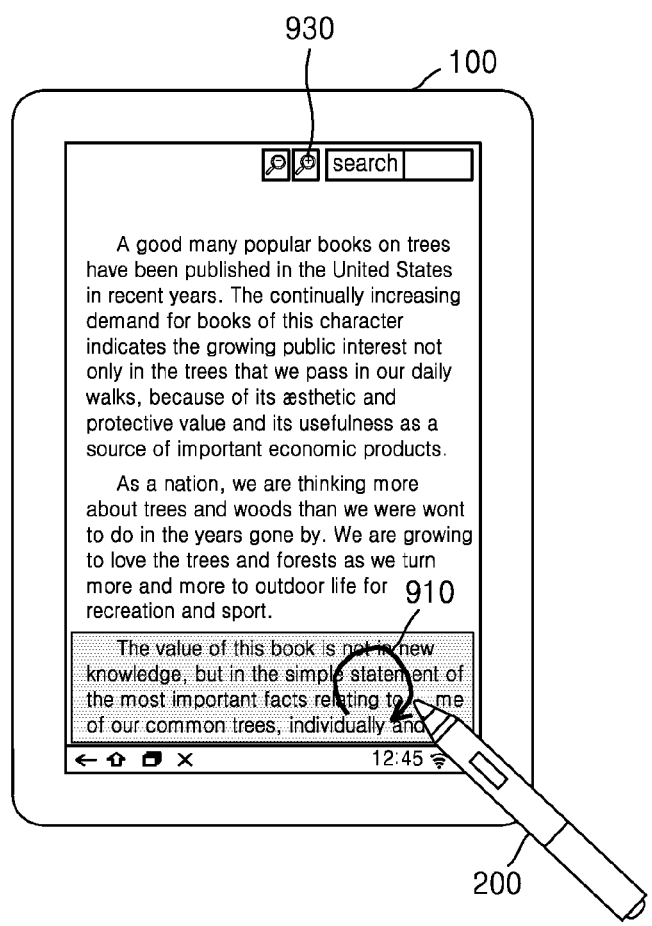
FIGS. 9A and 9B are views illustrating an input requesting magnification of a selected typed text content, according to an exemplary embodiment.
Figure 9B:
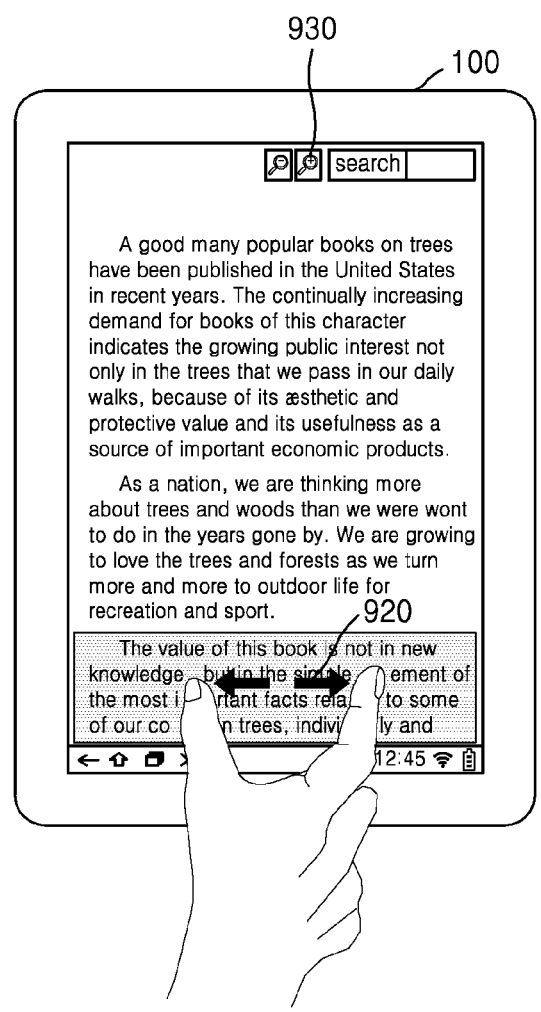

FIGS. 9A and 9B are views illustrating an input requesting magnification of a selected typed text content, according to an exemplary embodiment.

After a part of a typed text content is selected as illustrated in FIGS. 8A to 8C, the device 100 may receive an input requesting magnification of the selected part of the typed text content. For example, when the device 100 receives a user input 910 of drawing a circle clockwise on the display 121 by using the input tool 200, as illustrated in FIG. 9A, the device 100 may determine the user input 910 to be an input requesting magnification of the selected part of the typed text content.

Alternatively or additionally, when a pinch-out input 920 that the user move two fingers in a state of touching the display 121 in directions away from each other is performed, as illustrated in FIG. 9B, the device 100 may determine the pinch-out input 920 to be an input requesting magnification of a selected part of the handwritten text content.

Alternatively or additionally, as illustrated in FIGS. 9A and 9B, when an input of a magnification button 930, or a GUI button, that is displayed on the display 121 is received, or an input of a button, or a PUI button, included in the device 100 is received, the device 100 determines the input to be an input requesting magnification of the selected part of the typed text content.

The device 100 may receive a user motion input or a device motion input. For example, when the device 100 recognizes though a camera a user's motion of opening a hand or moving a hand away from the device 100, the device 100 may determine the motion to be an input requesting magnification of the selected part of the typed text content.

Also, when an input that the device 100 moves toward the user is received by using an acceleration sensor or a gyro sensor, the device 100 may determine the input to be an input requesting magnification of the selected part of the typed text content.

Alternatively or additionally, although FIGS. 9A and 9B illustrate only an input requesting magnification of a selected part of the typed text content, an input requesting reduction of a selected part of the typed text content may be performed in a similar method.

For example, when the device 100 receives a user input to draw a circle counterclockwise by using the input tool 200, a pinch-in input that the user moves two fingers in a state of touching the display 121 in directions toward each other, a reduction button input, a motion input that the user closes a hand, a motion input that a user's hand moves away from the device 100, or a motion input that the device 100 moves away from the user, the device 100 may determine each input to be an input requesting reduction of a selected part of the typed text content. However, the present exemplary embodiment is not limited thereto.

Figure 10:
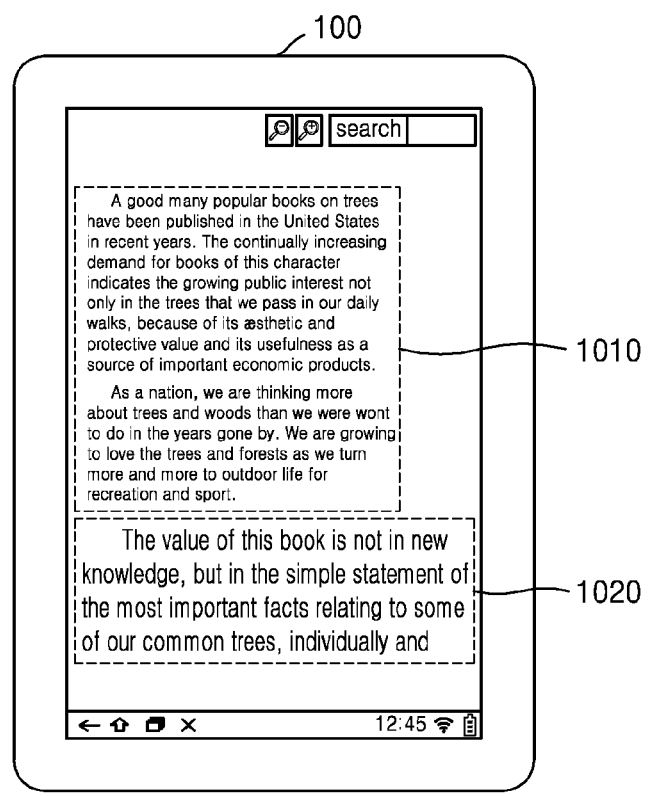
FIG. 10 is a view of a screen displaying magnified and reduced typed text contents, according to an exemplary embodiment.

FIG. 10 is a view of a screen displaying magnified and reduced typed text contents, according to an exemplary embodiment.

Referring to FIG. 10, when an input for magnification described with reference to FIGS. 9A and 9B is received, the device 100 magnifies a selected part 1020 of the typed text content, and reduces an unselected part 1010 of the typed text content. In this regard, the device 100 may reduce the unselected part 1010 of the typed text content based on a magnification used for magnifying the selected part 1020 of the typed text content. For example, when the selected part 1020 of the typed text content is magnified two times, the device 100 may reduce the unselected part 1010 of the typed text content 0.5 times. When the selected part 1020 of the typed text content is magnified three times, the device 100 may reduce the unselected part 1010 of the typed text content ⅓ times. However, the present exemplary embodiment is not limited thereto, and the typed text content may be magnified or reduced based on various magnifications.

Accordingly, as illustrated in FIG. 10, the device 100 displays the selected part 1020 of the typed text content by magnifying the same and the unselected part 1010 of the typed text content by reducing the same, and thus a user may recognize a part at first sight.

Alternatively or additionally, the device 100 may display the selected part of the typed text content in 3D and the unselected part of the typed text content in 2D.

Figure 11A:
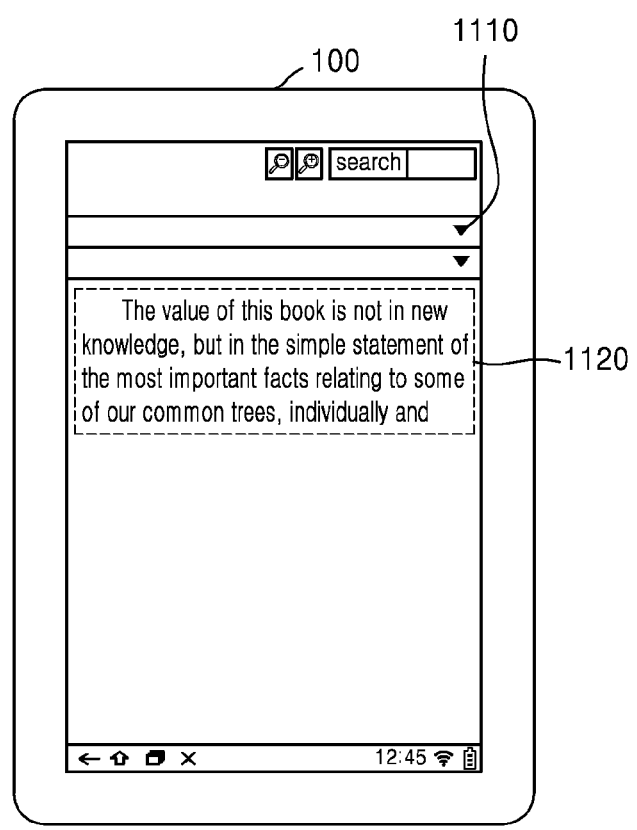
FIGS. 11A and 11B are views illustrating a method of displaying a modified typed text content on a display, according to an exemplary embodiment.
Figure 11B:
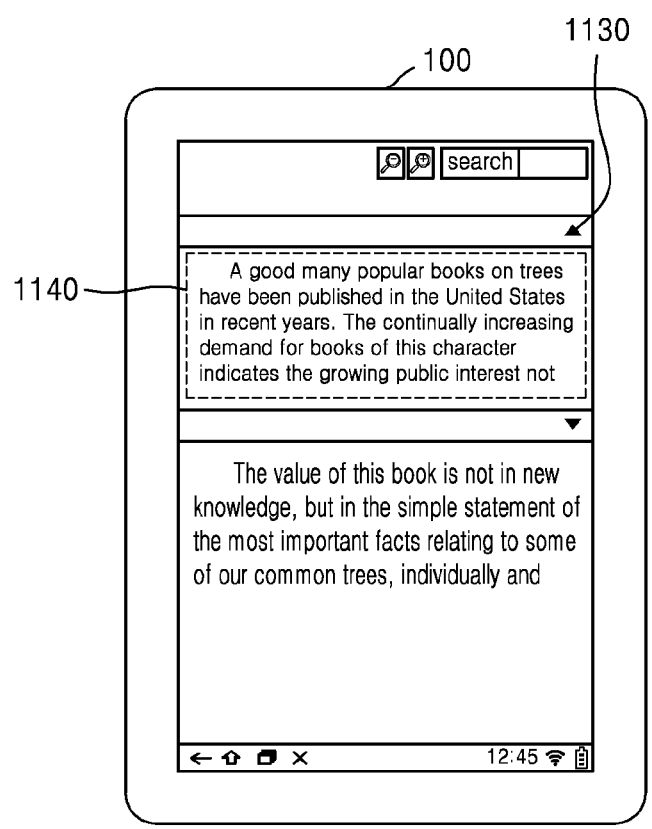

FIGS. 11A and 11B are views illustrating a method of displaying a modified typed text content on the display 121, according to an exemplary embodiment.

The device 100 may receive an input to select a part of the typed text content displayed on the display 121. Because the above operation is described in detail with reference to FIGS. 8A to 8C, a detailed description thereof is omitted.

Also, the device 100 may receive a "folding" input. For example, the "folding" input may be an input to select an icon, for example, a folding icon, or an input to draw a circle clockwise or counterclockwise by using the input tool 200 on the display 121, as described with reference to FIG. 9A, or a pinch-in input or a pinch-out input to move two fingers in a state of touching the display 121 in directions toward each other or away from each other, as described with reference to FIGS. 9A and 9B. However, the present exemplary embodiment is not limited thereto.

When a "folding" input is received, the device 100 may display only the selected part of the typed text content and may not display an unselected part of the typed text content. In this state, the device 100 displays a selected part 1120 of the typed text content by magnifying the same at a preset magnification or an input magnification, as illustrated in FIG. 11A. Also, the device 100 displays an "unfolding" icon 1110 to have the device 100 display an unselected part of the handwritten text content on the display 121.

When the user selects the "unfolding" icon 1110, as illustrated in FIG. 11B, a hidden part 1140 of the typed text content, that is, the unselected part of the typed text content, is displayed again, and the "unfolding" icon 1110 is changed to a "folding" icon 1130 to be displayed. Also, the device 100 may display the magnified part of the handwritten text content by reducing the same to an original size.

Also, when the user selects the "folding" icon 1130 again, as illustrated in FIG. 11A, the device 100 displays only the selected part 1120 of the typed text content, and does not display the unselected part 1140 of the typed text content. The "folding" icon 1130 is changed to the "unfolding" icon 1110 to be displayed.

Figure 12:
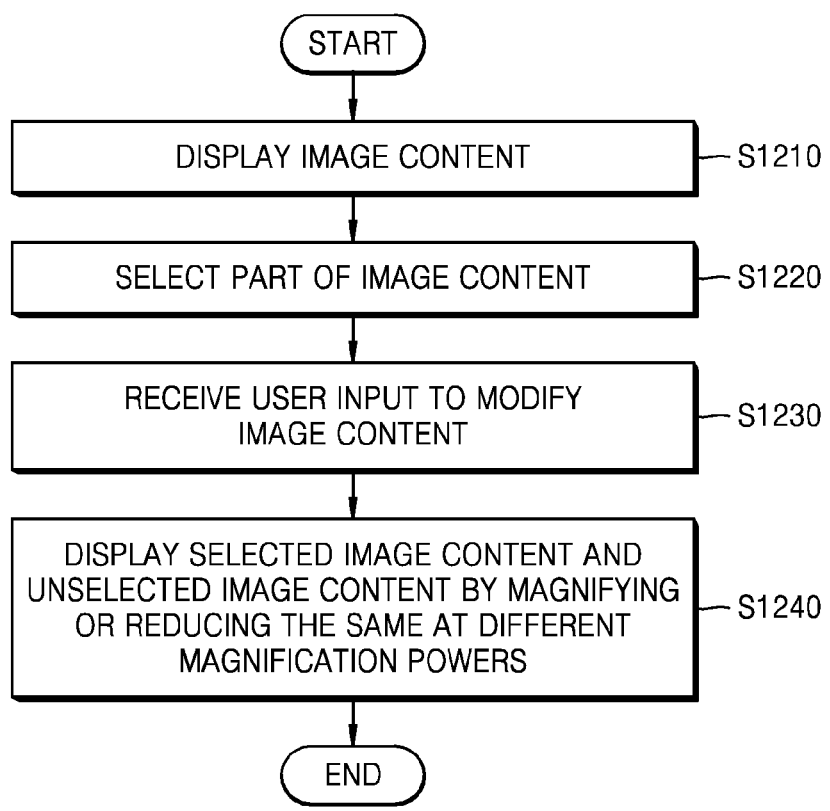
FIG. 12 is a flowchart of a method of displaying an image content by magnifying or reducing the same, according to an exemplary embodiment.

FIG. 12 is a flowchart of a method of displaying an image content by magnifying or reducing the same, according to an exemplary embodiment.

Referring to FIG. 12, in operation S1210, the device 100 displays an image content on the display 121.

The image content may be captured by the device 100, may be generated based on a user input, or may be generated by and received from an external device.

Also, the device 100 may display the image content on an execution window of a application. For example, the application may include a gallery application, an image edition application, etc., but the present exemplary embodiment is not limited thereto.

In operation S1220, the device 100 receives an input to select a part of the displayed image content.

For example, the user may draw a closed curve such as a circle or a polygon by using the input tool 200 over the image content displayed on the device 100. The device 100 may determine a part of the image content that is included in the closed curve, to be selected.

In operation S1230, the device 100 receives a user input to modify the image content.

For example, the device 100 may receive a user input requesting magnification or reduction of the image content, for example, an input to draw a pattern, a button input, a user motion input, a device motion input, a voice input, etc., but the present exemplary embodiment is not limited thereto.

In operation S1240, the device 100 displays the selected part of the image content and an unselected part of the image content by magnifying or reducing the same at different magnification powers.

The above-described operation is described below in detail with reference to the accompanying drawings.

Figure 13:
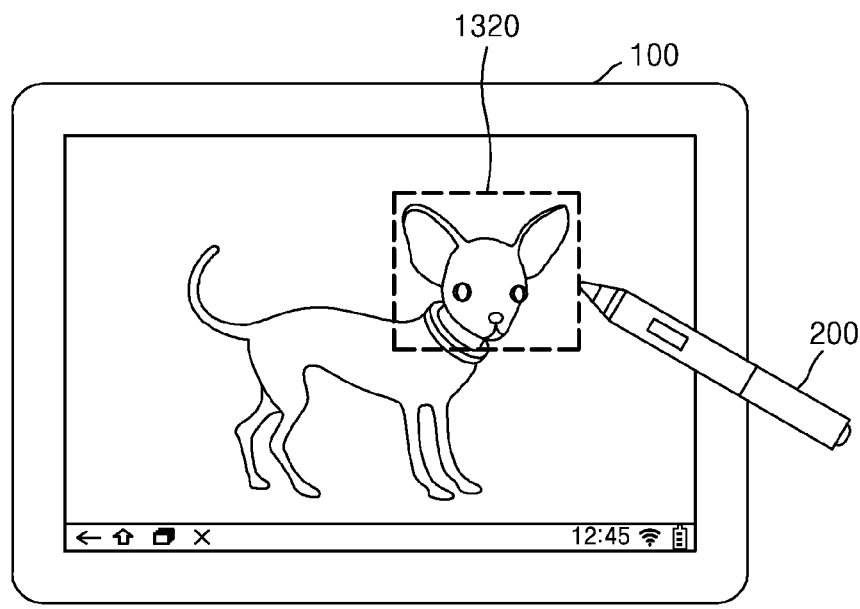
FIG. 13 is a view illustrating a method of selecting a part of an image content, according to an exemplary embodiment.

FIG. 13 is a view of a method of selecting a part of an image content, according to an exemplary embodiment.

Referring to FIG. 13, the device 100 executes a gallery application, and displays an image content on a gallery application execution screen.

Also, the device 100 may receive a user input to select an area of an image content. For example, a user may select an area by selecting or setting a shape of the area to be used to select and touching and dragging the image content. As illustrated in FIG. 13, when the user selects a rectangle as a shape to be used to select, then touches a first point of the image content, and drags to a second point, by using the input tool 200, a rectangular area 1320 having a diagonal line connecting the first and second points is selected.

However, the shape of the area and the user input to select the area are not limited thereto. The shape of the area may include a circle, an ellipse, a free curved shape, etc., and the user input may include a key input, a touch input, for example, tapping, double tapping, flicking, swiping, etc., a voice input, a motion input, etc.

Figure 14:
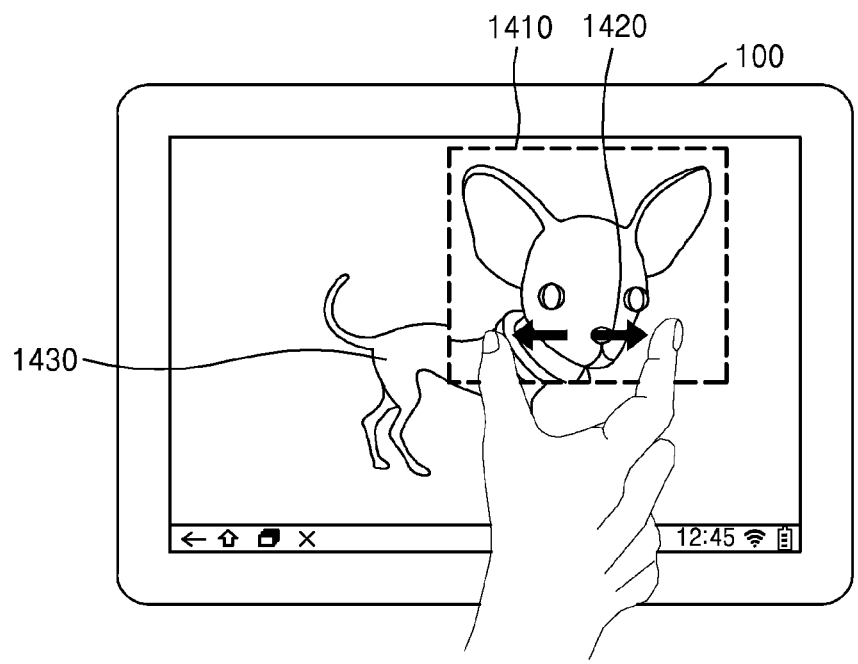
FIG. 14 is a view illustrating a method of displaying an image content by magnifying or reducing the same, according to an exemplary embodiment.

FIG. 14 is a view of a method of displaying an image content by magnifying or reducing the same, according to an exemplary embodiment.

The device 100, as described with reference to FIG. 13, after a part of the image content displayed on the display 121 is selected, an input requesting magnification of a selected part 1410 of the image content may be received.

For example, as illustrated in FIG. 14, when a pinch-out input 1420 that the user moves two fingers in a state of touching the selected part 1410 of the image content in directions away from each other is received, the device 100 may determine the pinch-out input 1420 to be an input requesting magnification of the selected part 1410 of the image content.

However, the present exemplary embodiment is not limited. When the device 100 receives an input to draw a pattern, for example, an input to draw a circle clockwise, on the display 121 by using the input tool 200, a magnification GUI input displayed on the display 121, or a PUI button included in the device 100, the device 100 may determine each input to be an input requesting magnification of a selected part of the image content.

Also, when the device 100 recognizes through a camera a motion of the user opening a hand or a motion of a user's hand moving away from the device 100, the device 100 may determine the motion to be an input requesting magnification of a selected part of the image content.

Also, when the device 100 receives an input that the device 100 moves toward the user by using an acceleration sensor or a gyro sensor, the device 100 may determine the input to be an input requesting magnification of a selected part of the image content.

Alternatively or additionally, although FIG. 14 illustrates only the input requesting magnification of the selected part of the image content, an input requesting reduction of the selected part of the image content may be processed in a similar method. For example, when a pinch-in input that the user moves two fingers in a state of touching the selected part of the image content in directions toward each other is received, the device 100 may determine the pinch-in input to be an input requesting reduction of the selected part of the image content.

Referring to FIG. 14, when an input requesting magnification of the selected part of the image content is received, the device 100 magnifies the selected part 1410 of the image content, and reduces an unselected part 1430 of the image content. In this state, the device 100 may reduce the unselected part 1430 of the image content based on the magnification used for magnifying the selected part 1410 of the image content.

For example, when the selected part 1410 of the image content is magnified two times, the device 100 may reduce the unselected part 1430 of the image content 0.5 times. When the selected part 1410 of the image content is magnified three times, the device 100 may reduce the unselected part 1430 of the image content ⅓ times. However, the present exemplary embodiment is not limited thereto, and a part of the image content may be magnified or reduced based on various magnifications.

Alternatively, the device 100 may display the selected part of the image content in 3D and the unselected part of the image content in 2D.

Figure 15:
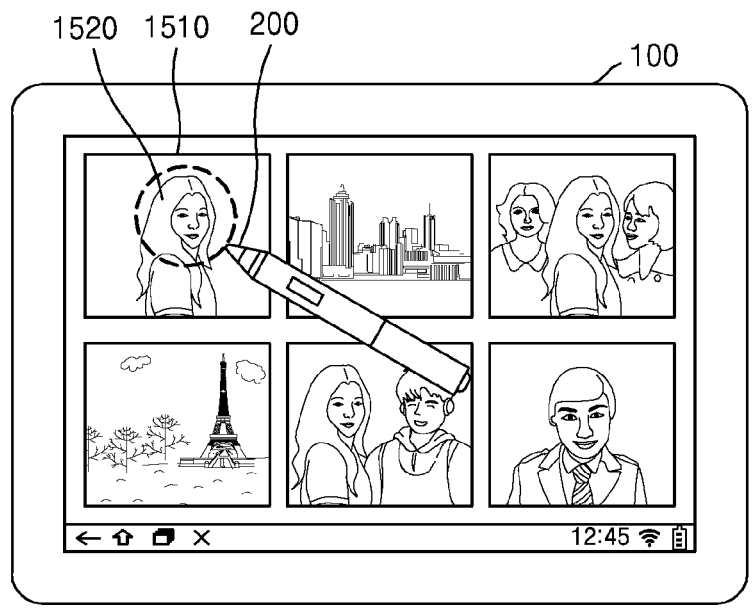
FIGS. 15 and 16 are views illustrating a method of displaying an image content by magnifying or reducing the same, according to an exemplary embodiment.
Figure 16:
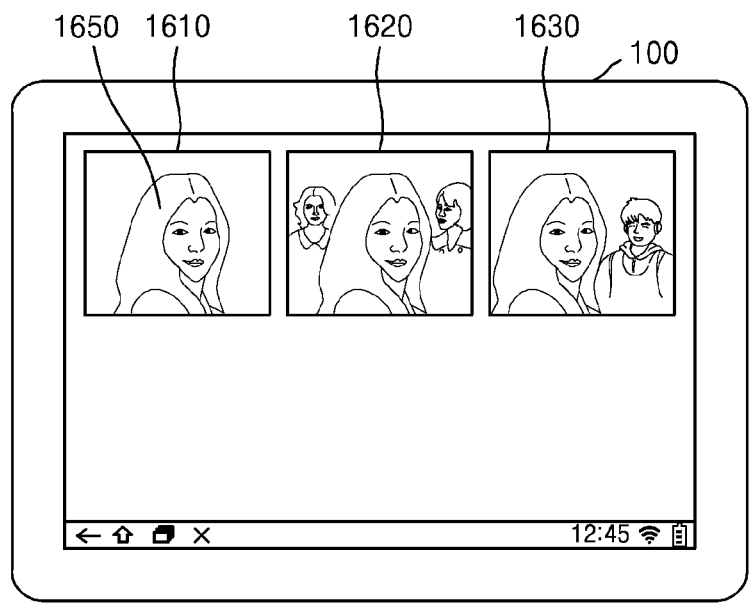

FIGS. 15 and 16 are views illustrating a method of displaying an image content by magnifying or reducing the same, according to an exemplary embodiment.

Referring to FIG. 15, the device 100 executes a gallery application, and displays a plurality of image contents on a gallery application execution screen.

The device 100 may receive a user input to select an object included in any one of the image contents. The object may include a person, a building, a character, etc.

For example, as illustrated in FIG. 15, an image 1520 of a first person may be selected by an input to touch and drag the image 1520 of the first person included in a first image content 1510, e.g., using the input tool 200. Alternatively, the image 1520 of the first person may be selected by an input to tap or double tap the image 1520 of the first person, e.g., using the input tool 200. However, the user input is not limited thereto, and may include a key input, a voice input, a motion input, etc., with or without the input tool 200.

When the first person is selected, as illustrated in FIG. 16, the device 100 extracts at least one of image contents 1610, 1620, and 1630 including the first person from the image contents by using, for example, face recognition.

However, the present exemplary embodiment is not limited thereto. When the selected object is a building, the device 100 may extract at least one of image contents including the building by using, for example, pattern recognition. Also, when the selected object is a character, the device 100 may extract at least one of image contents including the character by performing, for example, a character recognition technology using optical character recognition (OCR).

Also, the device 100 displays the extracted image content 1610 on the display 121, magnifies an image 1650 of an object, for example, the first person, included in the extracted image content 1610, and reduces another part of the image content 1610 except for the object. In this connection, the device 100 may reduce the other part of the image content 1610 except for the object based on a magnification used for magnifying the image 1650 of the object.

For example, when the image 1650 of the object is magnified two times, the device 100 may reduce the other part of the image content 1610 except for the object 0.5 times. When the image 1650 of the object is magnified three times, the device 100 may reduce the other part of the image content 1610 except for the object ⅓ times. However, the present exemplary embodiment is not limited thereto. The image content 1610 may be magnified or reduced based at various magnifications.

Also, the device 100 displays the extracted image content 1610 on the display 121, and may display the image of the object in 3D by giving a 3D effect to the image of the object, for example, the first person, included in the extracted image content 1610.

Figure 17:
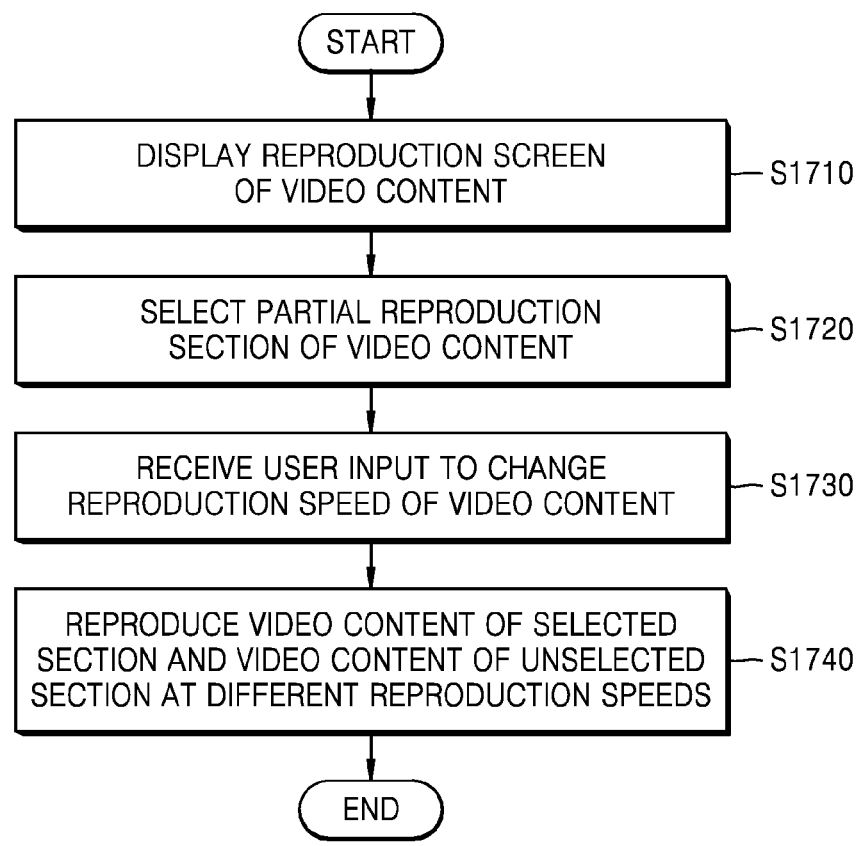
FIG. 17 is a flowchart of a method of reproducing a video content by changing a reproduction speed of the same, according to an exemplary embodiment.

FIG. 17 is a flowchart of a method of reproducing a video content by changing a reproduction speed of the same, according to an exemplary embodiment.

Referring to FIG. 17, in operation S1710, the device 100 reproduces a video content, and displays a reproduction screen of the video content.

The video content may be a video content captured by the device 100 or a video content generated by or received from an external device. Also, the device 100 may display the video content on an execution window of an application.

The reproduction screen of a video content may include a timeline indicating a reproduction time point of the video content.

In operation S1720, the device 100 receives a user input to select a partial reproduction section of an entire reproduction section of the video content.

For example, the device 100 may receive a user input to select the partial reproduction section on the timeline displayed on the reproduction screen.

Referring to operation S1730, the device 100 receives a user input to change a reproduction speed of a video content.

For example, the device 100 may receive a user input requesting control of the reproduction speed of the video content to be slower or faster than an existing reproduction speed. The user input requesting control of the reproduction speed of the video content to be slower or faster than the existing reproduction speed may include a pinch-out input to move two fingers touching the display 121 in directions away from each other, a pinch-in input to move two fingers touching display 121 in directions toward each other, an input to draw a pattern, a button input, a user motion input, a device motion input, a voice input, etc., but the present exemplary embodiment is not limited thereto.

In operation S1740, the device 100 reproduces a video content of a selected section and a video content of an unselected section at different reproduction speeds.

For example, the device 100 may control the reproduction speed of the selected section of the video content to be faster or slower than the reproduction speed of the unselected section of the video content. However, the present exemplary embodiment is not limited thereto.

Alternatively or additionally, the device 100 may reproduce the selected section of the video content and the unselected section of the video content at different reproduction volumes of sound.

Alternatively or additionally, the device 100 may receive a user input to select a sound included in the video content, and may control a reproduction speed or a reproduction volume with respect to a section including the selected sound.

Alternatively or additionally, the device 100 may control a reproduction speed or a reproduction volume with respect to a section in which a volume of sound included in the video content is equal to or greater than a preset value.

The above-described operation is described below in detail with reference to the accompanying drawings.

Figure 18:
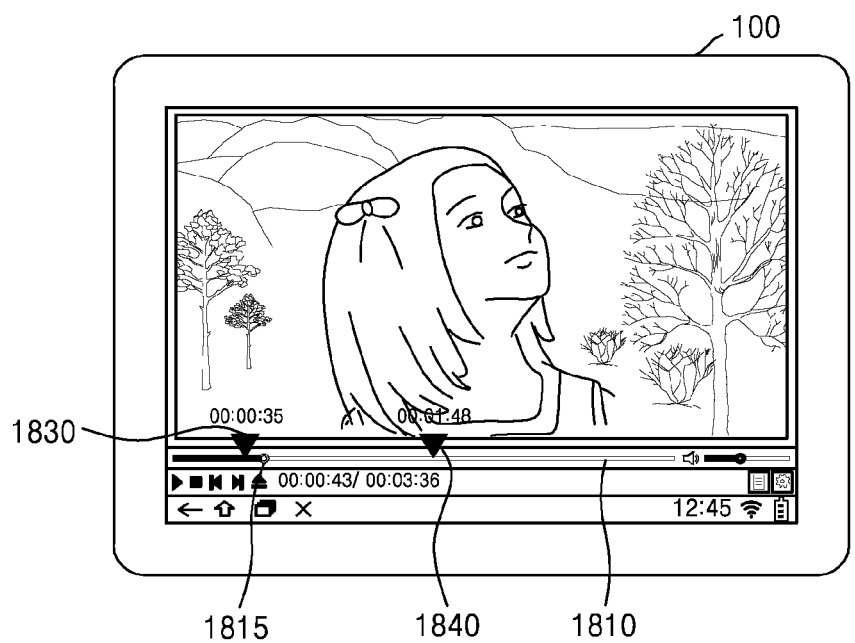
FIGS. 18 and 19 are views illustrating a method of selecting a partial section of an entire section of a video content, according to an exemplary embodiment.
Figure 19:
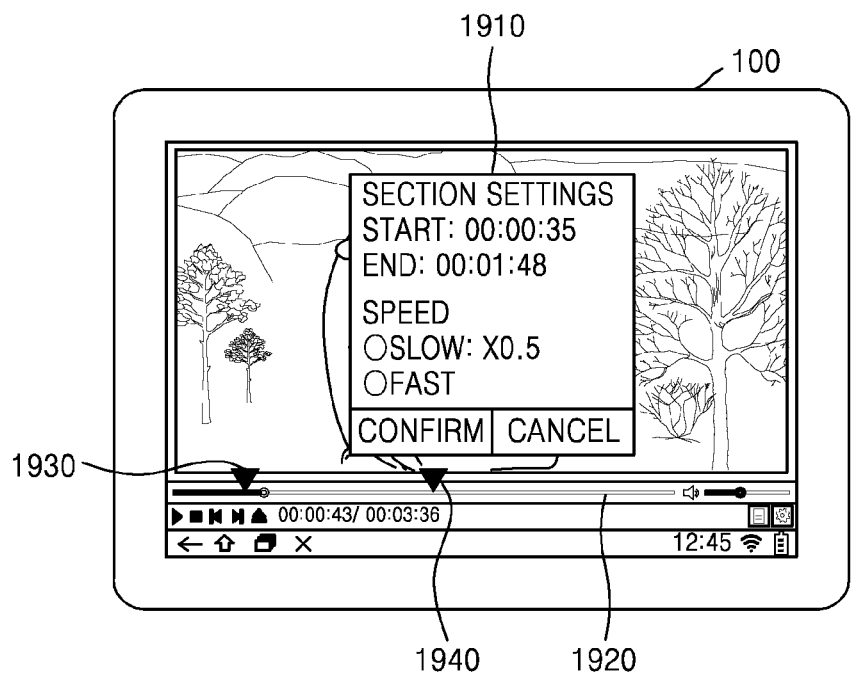

FIGS. 18 and 19 are views illustrating a method of selecting a partial section of an entire section of a video content, according to an exemplary embodiment.

Referring to FIG. 18, the device 100 executes a video reproduction application, and displays a video content on a video reproduction application execution screen. Also, the screen includes a timeline 1810 indicating a reproduction time point of the video content.

For example, as illustrated in FIG. 18, when a total reproduction time of the video content is 3 mins and 36 secs (00:03:36) and a current time point of the reproduced video is 43 secs (00:00:43), if the entire timeline 1810 displayed by the device 100 corresponds to a period of 3 mins and 36 secs, the device 100 displays, on the timeline 1810, an icon at a time point 1815 that corresponds to the time point of 43 secs. Additionally, a section of the timeline 1810 from a start point corresponding to a time point of 0 second of the timeline 1810 to the time point 1815 corresponding to a time point of 43 secs is displayed in highlight.

Additionally, the user selects a partial section of the video content by using the timeline 1810 of the video content, as illustrated in FIG. 18.

For example, the user selects the partial section by moving and setting a first icon 1830 indicating a start point of the partial section and a second icon 1840 indicating an end point of the partial section, which are marked on the timeline 1810.

In this state, when the first icon 1830 is located at a first position on the timeline 1810 indicating a first time point, for example, 35 secs (00:00:35) and the second icon 1840 is located at a second position on the timeline 1810 indicating a second time point, for example, 1 min and 48 secs (00:01:48), the device 100 determines a section between the first position and the second position to be the selected partial section.

When the partial section is selected, the device 100 may reproduce the selected partial section of the video content and an unselected section of the video content at different reproduction speeds.

For example, as illustrated in FIG. 18, when the video content corresponding to a period of 73 secs in the selected partial section, for example, from 35 secs to 1 min and 48 secs, is reproduced, the video content may be reproduced at an existing reproduction speed. Also, the video content in the unselected section, for example, a period of 0 second to 35 secs and a period of 1 min and 48 secs to 3 mins and 36 secs, may be reproduced at a reproduction speed slower or faster than the existing reproduction speed.

Alternatively, the device 100 may control a reproduction speed of the selected partial section of the video content to be faster or slower according to a preset ratio, and a reproduction speed of the unselected section of the video content to be the same as the existing reproduction speed.

Alternatively, the device 100 may control a reproduction speed of the video content included in the selected partial section to be fast at a preset ratio (a first ratio), and a reproduction speed of the unselected section of the video content to be slow at a preset ratio (a second ratio). In this state, the device 100 may set the second ratio based on the first ratio. For example, when the first ratio is two times, the second ratio may be 0.5 times, and when the first ratio is three times, the second ratio may be ⅓ times.

In contrast, the device 100 may control a reproduction speed of the video content included in the selected partial section to be slow at a preset ratio, and a reproduction speed of the unselected section of the video content to be fast at a preset ratio.

Alternatively, the device 100 may control a reproduction volume of the video content included in the selected partial section video content to be higher or lower than a reproduction volume of the unselected section of the video content.

Referring to FIG. 19, a user may select a partial section by directly inputting a start point and an end point of the section.

For example, as illustrated in FIG. 19, the device 100 displays a setting window 1910 on the display 121. The setting window 1910 includes an item to input a start point and an end point of the partial section to be selected, and an item to set a reproduction speed of the selected partial section.

As illustrated in FIG. 19, when the user inputs 35 secs (00:00:35) as the start point and 1 min and 48 secs (00:01:48) as the end point, the device 100 displays a first icon 1930 corresponding to the start point and a second icon 1940 corresponding to an end point on a timeline 1920.

Also, when the user inputs through the setting window 1910 a speed to be "slow" and a ratio to be "0.5" times, the device 100 may control the reproduction speed of a video content corresponding to a period of 73 secs of the selected partial section, for example, from 35 secs to 1 min and 48 secs, to be slow at the ratio of 0.5 times of an existing reproduction speed.

Figure 20:
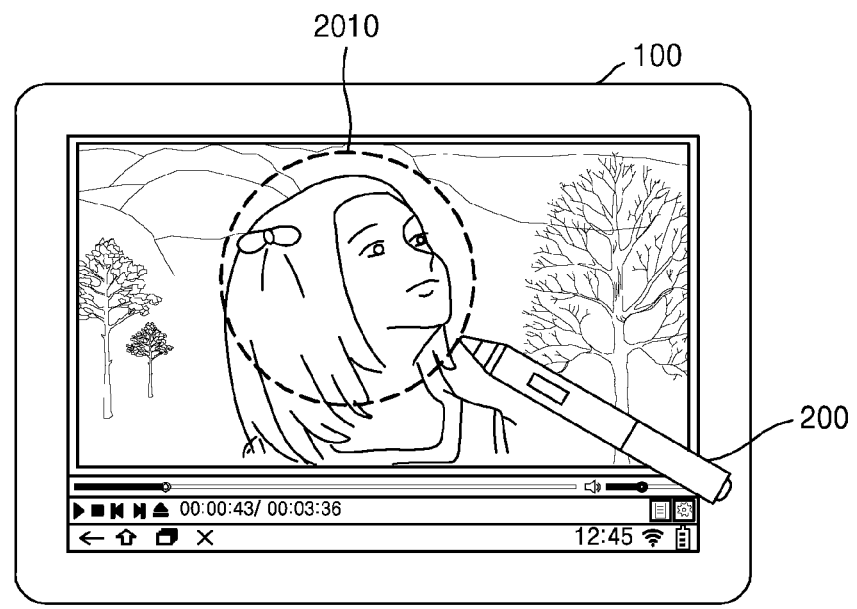
FIGS. 20, 21A, and 21B are views illustrating a method of reproducing a video content by changing a reproduction speed of the video content, according to an exemplary embodiment.
Figure 21A:
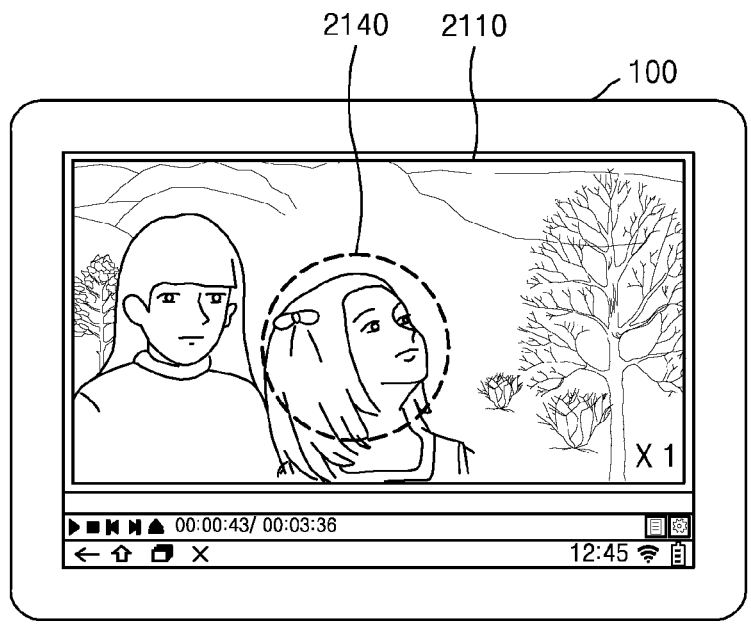
Figure 21B:
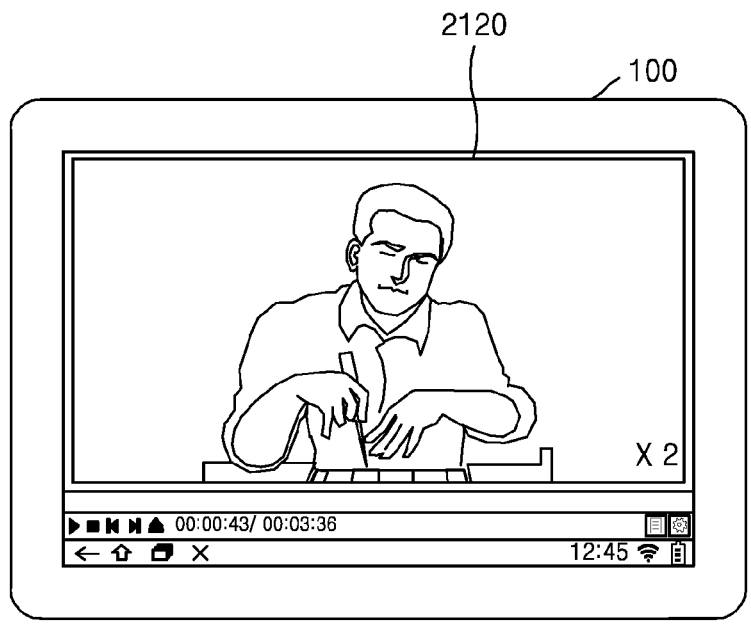

FIGS. 20, 21A, and 21B are views illustrating a method of reproducing a video content by changing a reproduction speed of the video content, according to an exemplary embodiment.

Referring to FIG. 20, the device 100 may execute a video application and display a plurality of frames forming a video content on a video application execution screen in order of time.

The device 100 may receive a user input to select an object included in any one of a plurality of frames and the object may include a person, a building, a character, etc.

For example, as illustrated in FIG. 20, an image of a first person may be selected by an input to touch and drag an image 2010 of the first person included in a first frame. Alternatively, the image 2010 of the first person may be selected by an input of tap or double tap the image 2010 of the first person. However, the user input is not limited thereto and may include a key input, a voice input, a motion input, etc.

When the first person is selected, the device 100 may extract at least one frame including the first person from the frames forming a video content by using, for example, face recognition.

When the frames are reproduced, the device 100 may reproduce an extracted frame and an unextracted frame at different reproduction speeds.

For example, as illustrated in FIG. 21A, an extracted frame 2110, that is, a frame including an image 2140 of the first person, may be reproduced at an existing reproduction speed, whereas an unextracted frame 2120, that is, a frame that does not include the image 2140 of the first person, may be reproduced at a reproduction speed faster, for example, two times, than the existing reproduction speed. However, the present exemplary embodiment is not limited thereto, and the reproduction speeds of the extracted frame and the unextracted frame may be changed in various ways.

Figure 22:
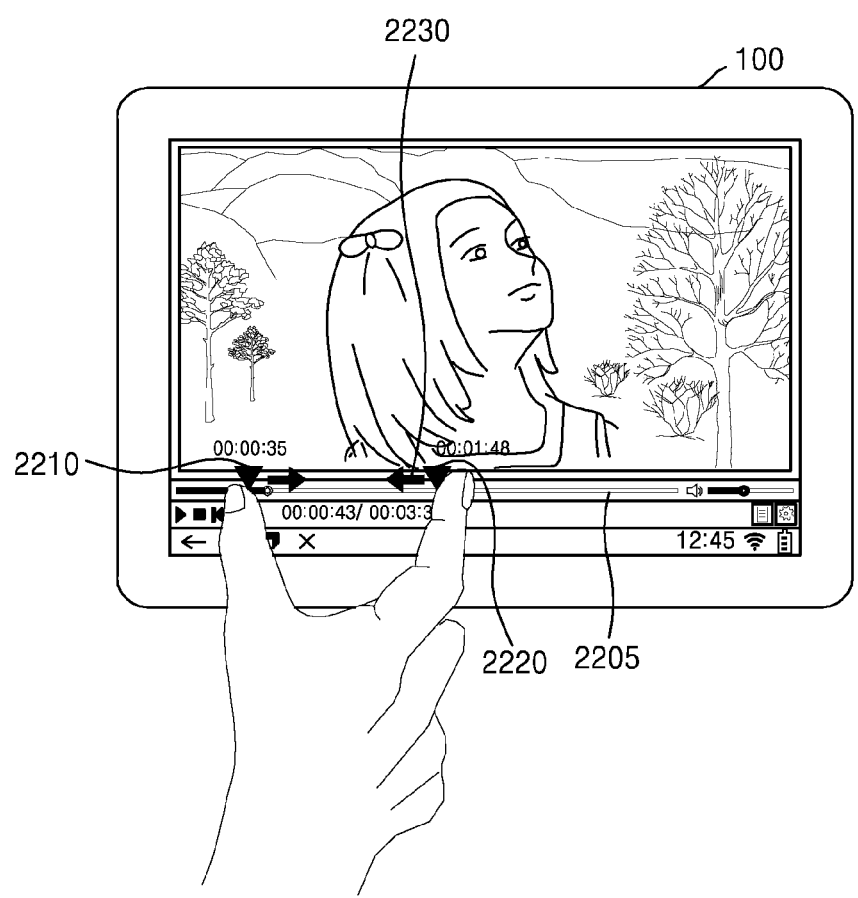
FIG. 22 is a view illustrating an input requesting a change in a reproduction speed for a selected section of a video content, according to an exemplary embodiment.

FIG. 22 is a view illustrating an input requesting a change in a reproduction speed for a selected section of a video content, according to an exemplary embodiment.

Referring to FIG. 22, the device 100 may execute a video application and display a video content on a video application execution screen. Also, the device 100 may display a timeline 2205 indicating a reproduction time point of the video content.

Alternatively, as illustrated in FIG. 22, the user may perform a pinch-in input 2230 to touch a first position on the timeline 2205 to be set to be a start point of a section by using one finger and a second position on the timeline 2205 to be set to be an end point of the section by using another finger and then dragging the two fingers in directions toward each other. In this state, the device 100 may display a first icon 2210 at the first position touched by the user and a second icon 2220 at the second position touched by the user, and the user may drag the first icon 2210 and the second icon 2220 touched by the fingers in directions toward each other.

The device 100 may set the reproduction speed of a selected partial section to be faster than an existing reproduction speed. Also, the reproduction speed of an unselected section may be equal to or slower than the existing reproduction speed. In this state, an increase ratio of the reproduction speed of the selected partial section may be determined according to a movement distance between the first icon 2210 and the second icon 2220. The above-described process is described below in detail with reference to FIGS. 23A and 23B.

Figure 23A:
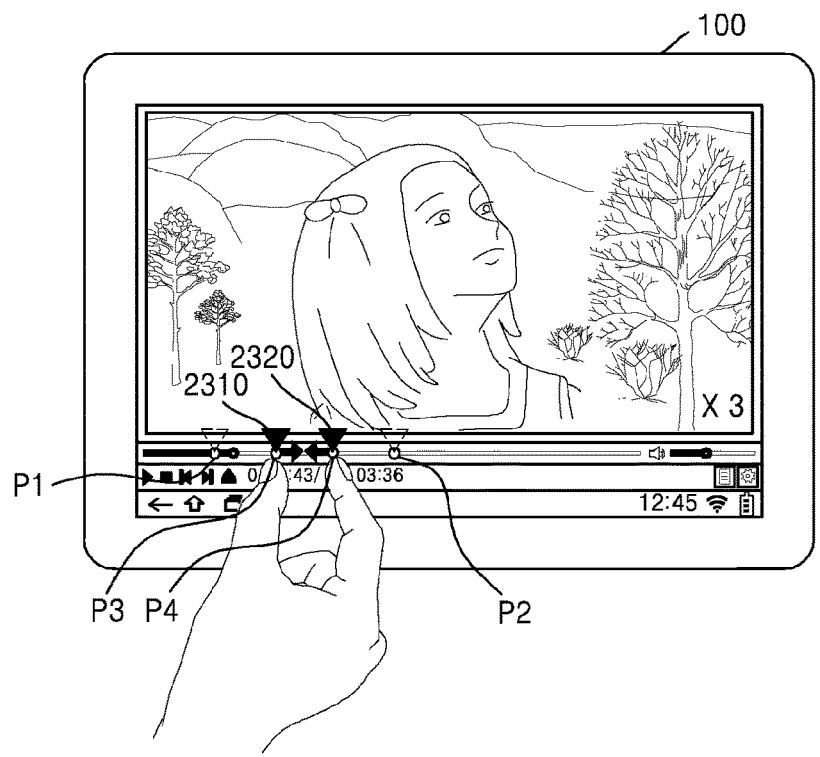
FIGS. 23A and 23B are views illustrating a method of differently setting a reproduction speed of a section selected according to the input request in FIG. 22.
Figure 23B:
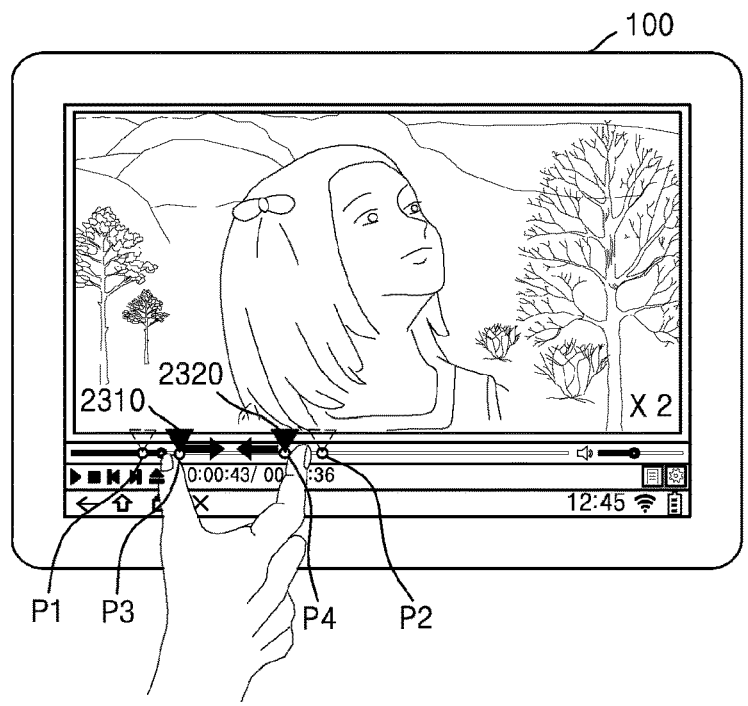

FIGS. 23A and 23B are views illustrating a method of differently setting a reproduction speed of a section selected according to the input request in FIG. 22.

The device 100 may differently set the reproduction speed of a partial section selected according to a movement distance between a first icon 2310 and a second icon 2320.

Referring to FIGS. 23A and 23B, the user may move the first icon 2310 located at a first position P1 and the second icon 2320 located at a second position P2 to a third position P3 and a fourth position P4, respectively, by the pinch-in input 2230 described with reference to FIG. 22, that is, touching the first position P1 with one finger and touching the second position P2 with another finger and then dragging the two fingers in directions toward each other.

When a distance between the third position P3 and the fourth position P4 is ⅓ of the distance between the first position P1 and the second position P2, as illustrated in FIG. 23A, the device 100 may set the reproduction speed of a partial section to be three times faster than the existing reproduction speed.

Alternatively or additionally, when a distance between the third position P3 and the fourth position P4 is ½ of the distance between the first position P1 and the second position P2, as illustrated in FIG. 23B, the device 100 may set the reproduction speed of a partial section to be two times faster than the existing reproduction speed. However, the present exemplary embodiment is not limited thereto.

Figure 24:
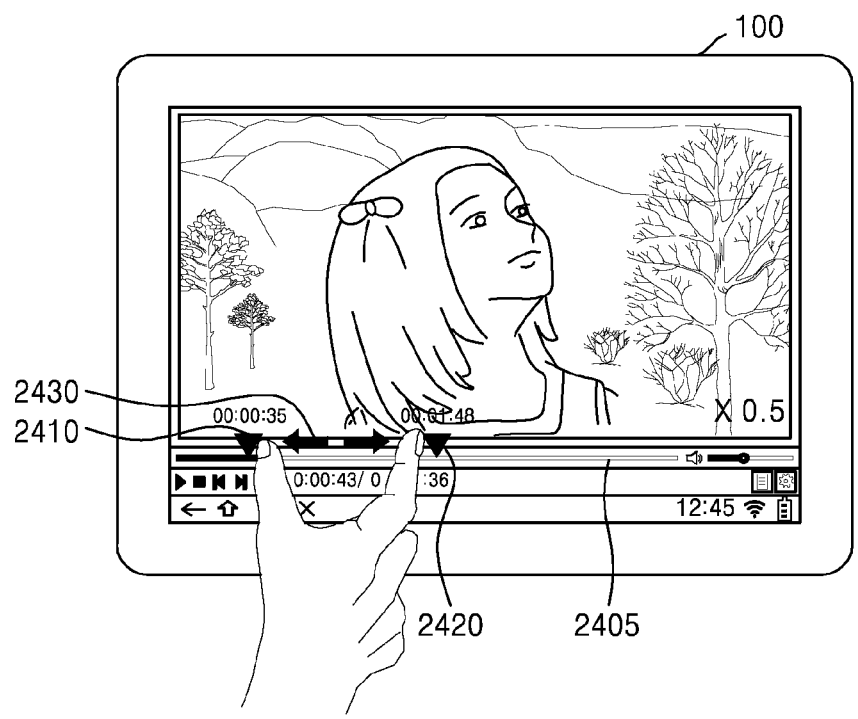
FIG. 24 is a view illustrating an input requesting a change in a reproduction speed for a selected section of a video content, according to an exemplary embodiment.

FIG. 24 is a view illustrating an input requesting a change in a reproduction speed for a selected section of a video content, according to an exemplary embodiment.

Referring to FIG. 24, the device 100 may execute a video application and display a video content on a video application execution screen. Also, the device 100 may display a timeline 2405 indicating a reproduction time point of a video content.

Alternatively, as illustrated in FIG. 24, the user may perform a pinch-out input 2430 to touch a first position of the timeline 2405 to be set to be a start point of a partial section by using one finger and a second position of the timeline 2405 to be set to be an end point of the partial section by using another finger and then dragging the two fingers in directions away from each other. In this state, the device 100 may display a first icon 2410 at a first position touched by the user and a second icon 2420 at a second position touched by the user, and the user may drag the first icon 2410 and the second icon 2420 touched by the fingers in directions toward each other.

The device 100 may set the reproduction speed of a selected partial section to be slower than an existing reproduction speed. Also, the reproduction speed of an unselected section may be equal to or faster than the existing reproduction speed. In this state, a decrease ratio of the reproduction speed of the selected partial section may be determined according to a movement distance between the first icon 2410 and the second icon 2420. The above-described process is described below in detail with reference to FIGS. 25A and 25B.

Figure 25A:
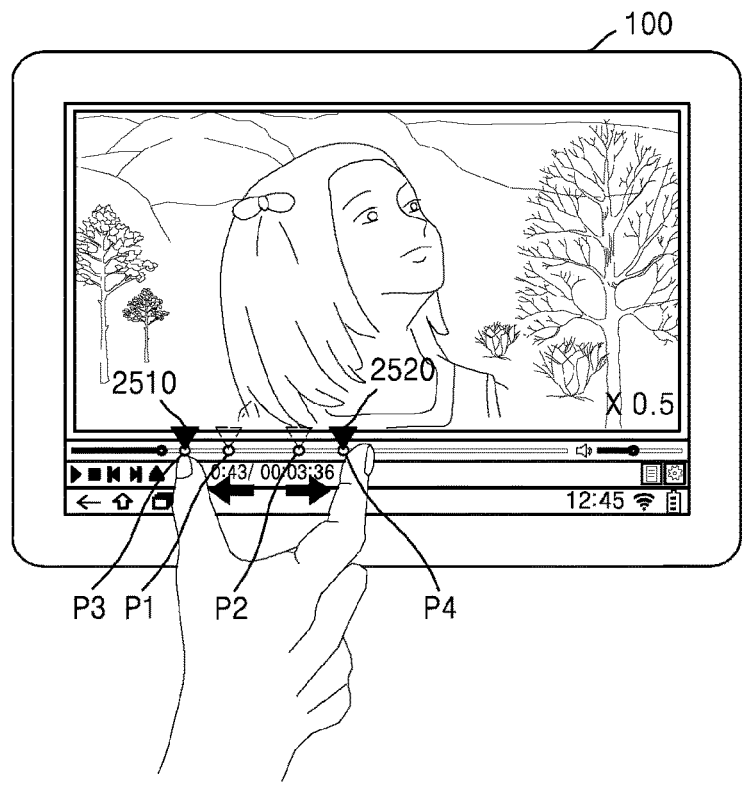
FIGS. 25A and 25B are views illustrating a method of differently setting a reproduction speed of a section selected according to the input request in FIG. 24.
Figure 25B:
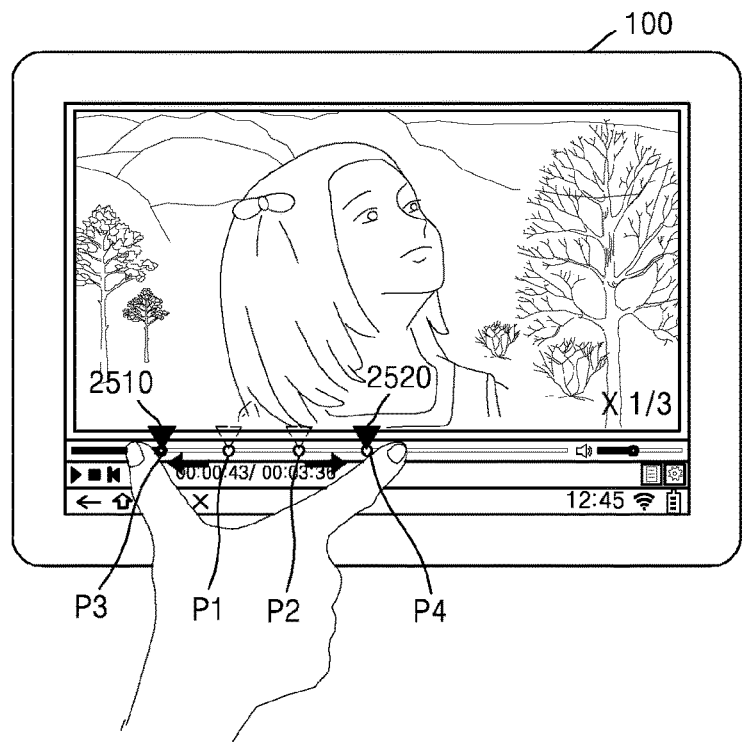

FIGS. 25A and 25B are views illustrating a method of differently setting a reproduction speed of a section selected according to the input request in FIG. 24.

The device 100 may differently set the reproduction speed of a partial section selected according to a movement distance between a first icon 2510 and a second icon 2520.

Referring to FIGS. 25A and 25B, the user may move the first icon 2510 located at a first position P1 and the second icon 2520 located at a second position P2 to a third position P3 and a fourth position P4, respectively, by the pinch-out input 2430 described with reference to FIG. 24, that is, touching the first position P1 with one finger and touching the second position P2 with another finger and then dragging the two fingers in directions away from each other.

When a distance between the third position P3 and the fourth position P4 is two times longer than the distance between the first position P1 and the second position P2, as illustrated in FIG. 25A, the device 100 may set the reproduction speed of a partial section to be ½ time slower than the existing reproduction speed.

Alternatively or additionally, when a distance between the third position P3 and the fourth position P4 is three times longer than the distance between the first position P1 and the second position P2, as illustrated in FIG. 23B, the device 100 may set the reproduction speed of a partial section to be ⅓ times slower than the existing reproduction speed. However, the present exemplary embodiment is not limited thereto.

Figure 26:
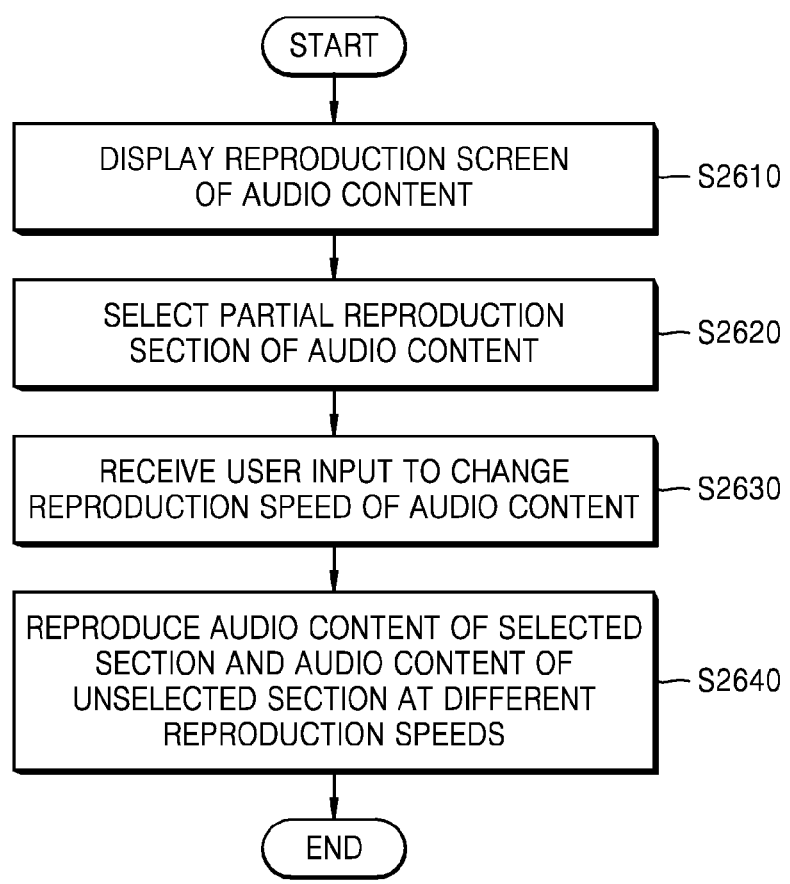
FIG. 26 is a flowchart of a method of reproducing an audio content by changing a reproduction speed of the same, according to an exemplary embodiment.

FIG. 26 is a flowchart of a method of reproducing an audio content by changing a reproduction speed of the same, according to an exemplary embodiment.

Referring to FIG. 26, in operation S2610, the device 100 reproduces an audio content, and displays a reproduction screen of the audio content.

The audio content may be a voice file, a music file, etc., which is recorded by the device 100, or may be generated by and received from an external device. Also, the device 100 may display the audio content on an execution window of an application.

The reproduction screen of an audio content may include a timeline indicating a reproduction time point of the audio content.

In operation S2620, the device 100 receives a user input to select a partial reproduction section of an entire reproduction section of the audio content.

For example, the device 100 may receive a user input to select the partial reproduction section on the timeline displayed on the reproduction screen.

In operation S2630, the device 100 receives a user input to change a reproduction speed of the audio content.

For example, the device 100 may receive a user input requesting control of the reproduction speed of the audio content to be slower or faster than an existing reproduction speed. The user input requesting control of the reproduction speed of the audio content to be slower or faster than the existing reproduction speed may include a pinch-out input to move two fingers touching the display 121 in directions away from each other or in directions toward each other, an input to draw a pattern, a button input, a user motion input, a device motion input, a voice input, etc., but the present exemplary embodiment is not limited thereto.

In operation S2640, the device 100 reproduces an audio content of a selected section and an audio content of an unselected section at different reproduction speeds.

For example, the device 100 may control the reproduction speed of the audio content of the selected section to be faster or slower than the reproduction speed of the audio content of the unselected section. However, the present exemplary embodiment is not limited thereto.

Alternatively or additionally, the device 100 may reproduce the audio content of the selected section and the audio content of the unselected section at different reproduction volumes of sound.

Alternatively or additionally, the device 100 may receive a user input to select a sound included in the audio content, and may control a reproduction speed or a reproduction volume with respect to a section including the selected sound.

Alternatively or additionally, the device 100 may control a reproduction speed or a reproduction volume with respect to a section in which a volume of sound included in the audio content is equal to or greater than a preset value.

The above-described operation is described below in detail with reference to the accompanying drawings.

Figure 27:
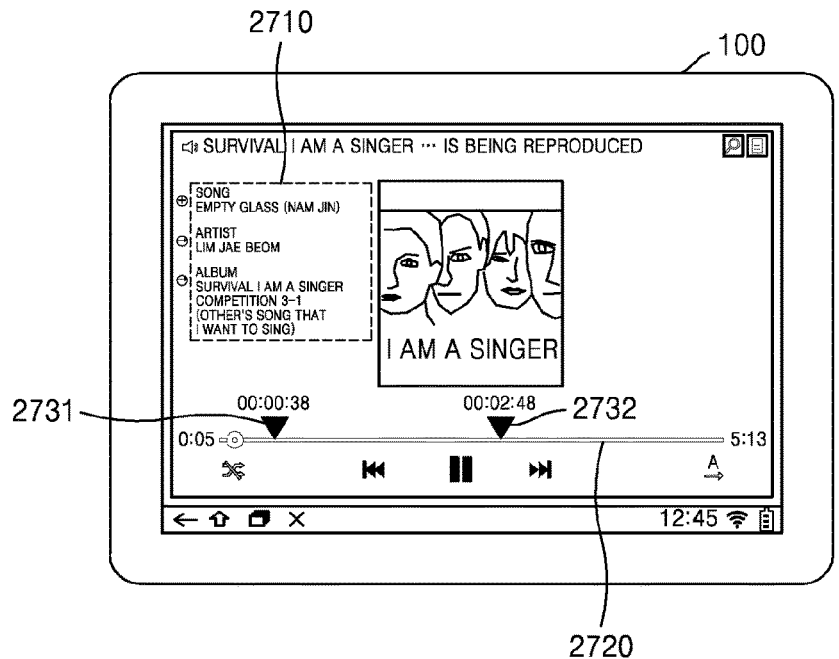
FIG. 27 is a view illustrating a method of selecting a partial section of an entire section of an audio content, according to an exemplary embodiment.

FIG. 27 is a view illustrating a method of selecting a partial section of an entire section of an audio content, according to an exemplary embodiment.

Referring to FIG. 27, the device 100 may execute an audio reproduction application and display an audio content on an audio reproduction application execution screen. Also, a reproduction screen of the audio content may include information 2710 about the audio content, for example, the name of the audio content, the manufacturer of the audio content, the singer of the audio content, the album including the audio content. The reproduction screen of the audio content may include a timeline 2720 indicating a reproduction time point of the audio content, a reproduction button to reproduce the audio content, a stop button to stop reproduction of the audio content, a previous song button to move to a previous audio content in a reproduction list, a next song button to move to a next audio content in the reproduction list.

Alternatively or additionally, as illustrated in FIG. 27, the user may select a partial section of the audio content by using the timeline 2720 of the audio content.

For example, the user may select a partial section by moving on the timeline 2720 a first icon 2731 indicating a start point of the partial section and a second icon 2732 indicating an end point of the partial section, which are marked on the timeline 2720.

When the first icon 2731 is located at a first position on the timeline 2720 indicating a first time point and the second icon 2732 is located at a second position on the timeline 2720 indicating a second time point, the device 100 may determine a section between the first time point and the second time point to be a partial section.

When the partial section is selected, the device 100 may reproduce an audio content corresponding to a selected partial section and an audio content corresponding to an unselected partial section at different reproduction speeds. The above-described operation is described below in detail with reference to FIGS. 28 and 29.

Figure 28:
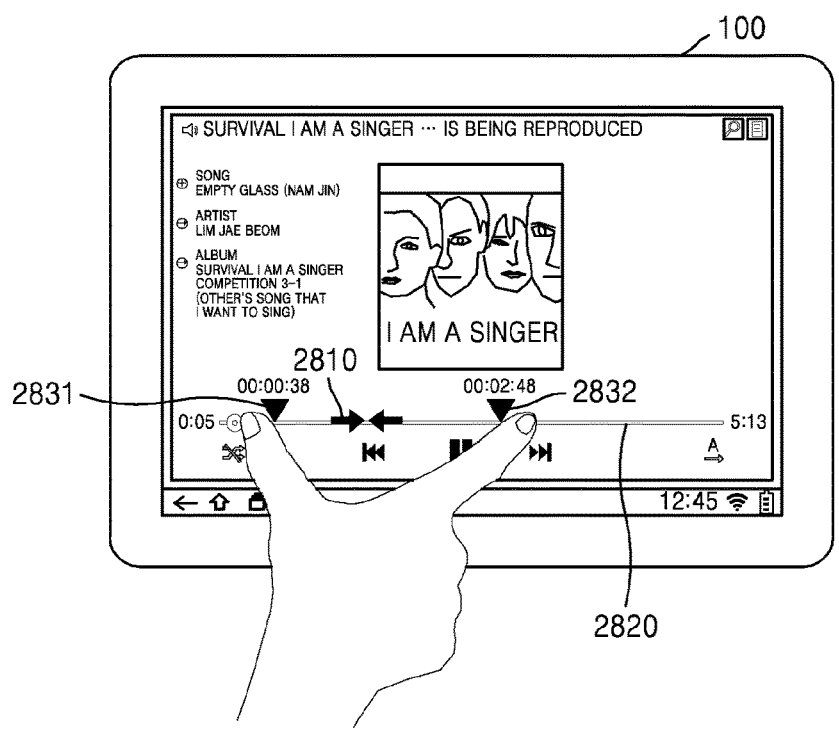
FIGS. 28 and 29 are views illustrating an input requesting a change in a reproduction speed for a selected section of an audio content, according to an exemplary embodiment.
Figure 29:
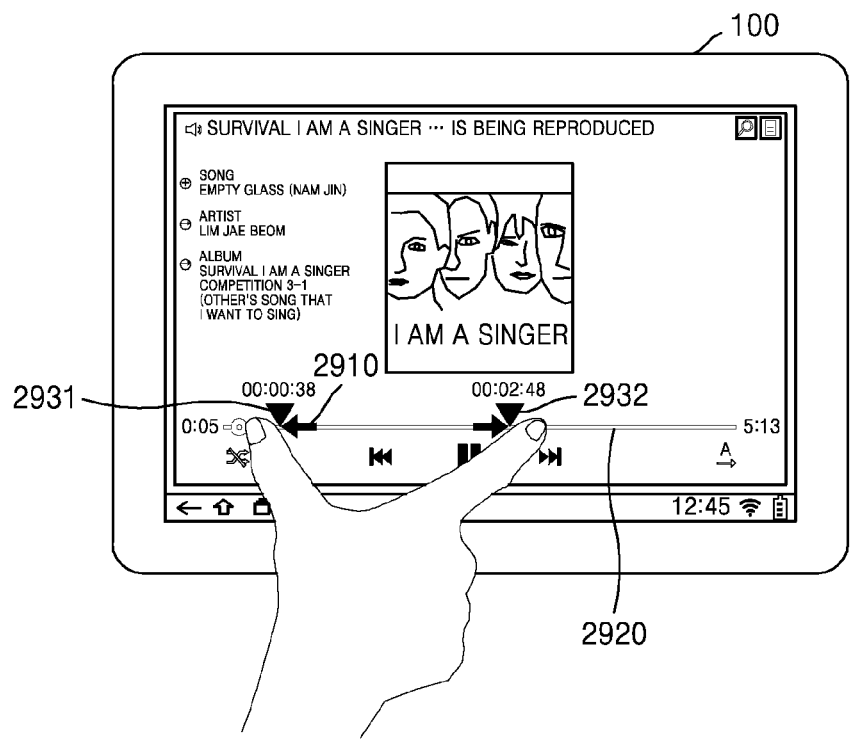

FIGS. 28 and 29 are views illustrating an input requesting a change in a reproduction speed for a selected section of an audio content, according to an exemplary embodiment.

Referring to FIG. 28, a partial audio section is selected and the user may perform a pinch-in input 2810 to touch a first position corresponding to a start point of a partial section on a timeline 2820 by using one finger and a second position corresponding to an end point of the partial section on the timeline 2820 by using another finger and then dragging the two fingers in directions toward each other. For example, a first icon 2831 displayed at the first position and a second icon 2832 displayed at the second position may be dragged in directions toward each other.

The device 100 may set the reproduction speed of a selected partial section to be faster than an existing reproduction speed. In this state, an increase ratio of the reproduction speed of the selected partial section may be determined to be a preset ratio or according to a movement distance between the first icon 2831 and the second icon 2832. Because the above-described process is described below in detail with reference to FIGS. 23A and 23B, a detailed description thereof is omitted.

Also, the device 100 may set the reproduction speed of the unselected section to be the same as the existing reproduction speed or slower than the existing reproduction speed.

Alternatively or additionally, referring to FIG. 29, the user may perform, on the timeline 2920, a pinch-out input 2910 to touch a first position corresponding to a start point of a partial section on a timeline 2920 by using one finger and a second position corresponding to an end point of the partial section on the timeline 2920 by using another finger and then dragging the two fingers in directions away from each other. For example, a first icon 2931 displayed at the first position and a second icon 2932 displayed at the second position may be dragged in directions separated each other.

The device 100 may set the reproduction speed of the selected section to be slower than the existing reproduction speed. In this state, a decrease ratio of the reproduction speed of the selected section may be determined to be a preset ratio or according to a movement distance between the first icon 2931 and the second icon 2932. Because the above-described process is described below in detail with reference to FIGS. 25A and 25B, a detailed description thereof is omitted.

Also, the device 100 may set the reproduction speed of the unselected section to be the same as the existing reproduction speed or faster than the existing reproduction speed.

Figure 30:
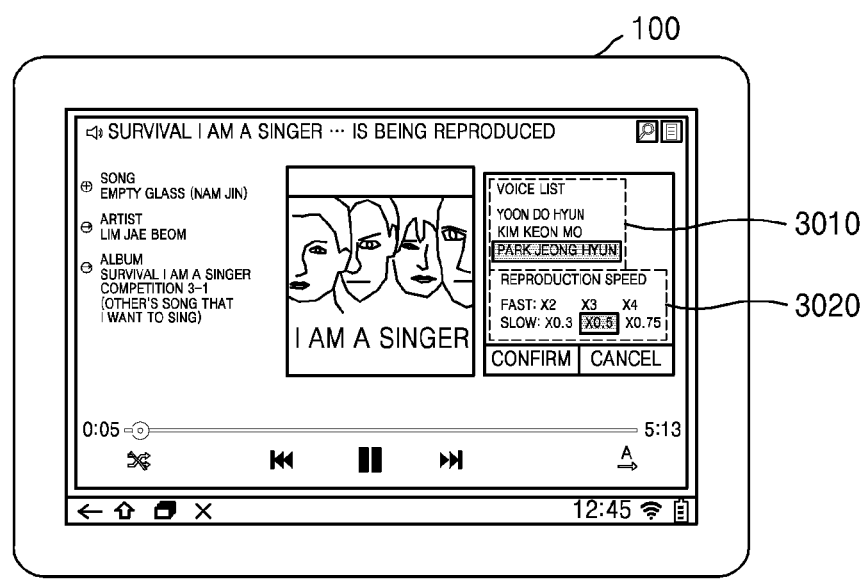
FIG. 30 is a view illustrating a method of reproducing an audio content by changing a reproduction speed of the audio content, according to an exemplary embodiment.

FIG. 30 is a view illustrating a method of reproducing an audio content by changing a reproduction speed of the audio content, according to an exemplary embodiment.

Referring to FIG. 30, the device 100 may execute an audio reproduction application and display a reproduction screen of the audio content on an audio reproduction application execution screen.

The reproduction screen of the audio content may include information about the audio content, a timeline indicating a reproduction time point of the audio content, a reproduction button to reproduce the audio content, a stop button to stop reproduction of the audio content, a previous song button to move to a previous audio content in a reproduction list, a next song button to move to a next audio content, etc.

Also, the device 100 may display a voice list 3010 based on information about voice included in the audio content. For example, when the audio content is a song file sung by signers A, B, and C together, the audio content may include the voice of A, the voice of B, and the voice of C. The device 100, as illustrated in FIG. 30, may display a voice list 3010 for selecting any one of the voice of A, the voice of B, the voice of C. The voice information included in the audio content may be information included in meta data of the audio content.

The user may select any one voice in the voice list 3010 and set a reproduction speed for an audio section including a selected voice by using a reproduction speed setting menu 3020. For example, as illustrated in FIG. 30, the user may set whether the reproduction speed is faster or slower than the existing reproduction speed or how many times it will be.

Alternatively or additionally, as illustrated in FIG. 30, when the singer C is selected from the voice list and a reproduction speed of 0.5 times slowly is selected, according to a user input, the device 100 may set a reproduction speed of an audio section including the voice of C to be 0.5 times slower than the existing reproduction speed. In this state, information about an audio section including the voice of C may be included in meta data of the audio content. Alternatively, the device 100 may extract the audio section including the voice of C from the audio content through voice identification.

Also, the device 100 may select a partial reproduction section of a section of the audio content through voice recognition. For example, when the audio content includes the voice of A, the voice of B, and the voice of C, as illustrated in FIG. 30, the user may select a time point when the voice of C is reproduced, thereby outputting the voice of C. The device 100 may extract an audio section including the voice of C of the section of the audio content, by recognizing the voice of C.

Alternatively, when a time point of the audio section is selected, the device 100 may extract an audio section including the same voice as the voice, for example, the voice of C, reproduced at a selected time point, based on the information about an audio section including the metal data of the audio content.

Figure 31:
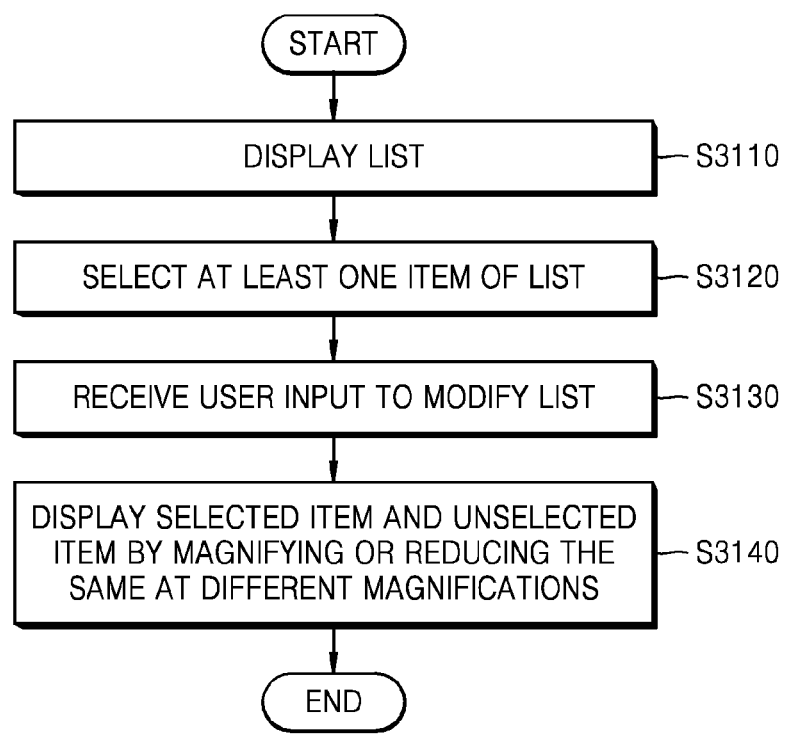
FIG. 31 is a flowchart of a method of displaying a list by magnifying or reducing the same, according to an exemplary embodiment.

FIG. 31 is a flowchart of a method of displaying a list by magnifying or reducing the same, according to an exemplary embodiment.

Referring to FIG. 31, in operation S3110, the device 100 displays a list.

The list signifies a set of items having the same attributes. For example, the list may be an array of data items satisfying conditions in sequence. The list may include a telephone number list, a message list, a recommended book list, a schedule list, a financial management list, a photo list, a music file list, a moving picture list, etc. However, the present exemplary embodiment is not limited thereto.

Also, the list may be generated by the device 100 or may be generated by or received from an external device.

Also, the device 100 may display a list on an application execution window. For example, the application may include a phonebook application, a message application, an album application, a household account book application, etc. However, the present exemplary embodiment is not limited thereto.

In operation S3210, the device 100 receives a user input to select at least one item included in the list.

In operation S3130, the device 100 receives a user input to modify the list.

For example, the device 100 may receive a user input requesting magnification or reduction of the list. The input requesting magnification or reduction of the list may include an input to draw a pattern, a button input, a user motion input, a device motion input, a voice input, etc., but the present exemplary embodiment is not limited thereto.

In operation S3140, the device 100 displays the selected item and an unselected item on the display 121 by magnifying or reducing the same at different magnifications.

The above-described operation is described below in detail with reference to the accompanying drawings.

Figure 32:
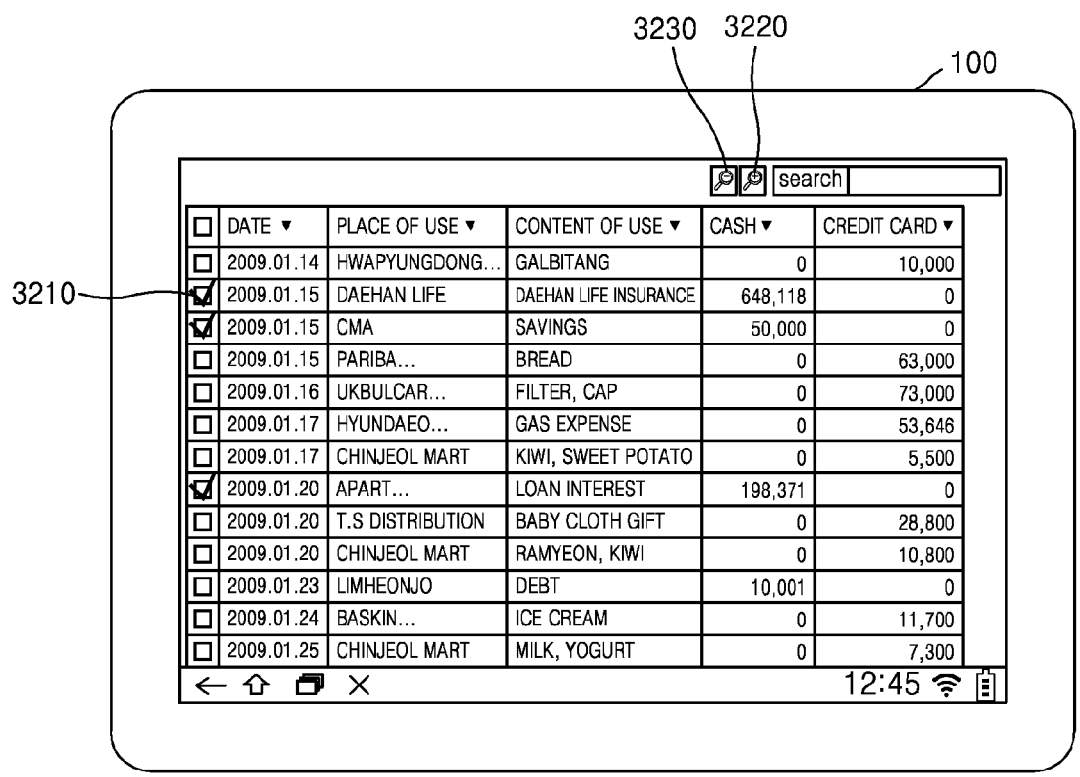
FIG. 32 is a view illustrating a method of selecting at least one item of a list, according to an exemplary embodiment.

FIG. 32 is a view illustrating a method of selecting at least one item of a list, according to an exemplary embodiment.

Referring to FIG. 32, the device 100 may execute a household account book application and display a financial expense list on a household account book application execution screen. The financial expense list may include items of financial expenses arrayed by the user in order of date.

Also, an item included in the financial expense list may include a date of expense, a place of use of expense, a reason for expense, cash or card, an amount of expense, etc.

As illustrated in FIG. 32, the user may select at least one of items included in a financial expense list. For example, the user may select an item by touching the item itself or a rectangular icon 3210 indicating the item. Also, the user may select a plurality of items.

When the device 100 receives an input to select an item, the device 100 may display a check mark on the rectangular icon 3210 of the item or may display the item by highlighting the same.

After the item is selected, the device 100 may receive a user input requesting magnification or reduction of the selected item. For example, as illustrated in FIG. 32, when a magnification input icon 3220 displayed on the display 121 is touched, the device 100 may determine the touch to be an input requesting magnification of the selected item. In contrast, a reduction input icon 3230 displayed on the display 121 is touched, the device 100 may determine the touch to be an input requesting reduction of the selected item.

In addition, when a user input to draw a circle clockwise on the display 121, a pinch-out input that the user moves two fingers in a state on touching the display 121 in directions away from each other, or an input of a button, for example, a physical user interface (PUI) button, included in the device 100 is received, the device 100 may determine each input to be an input requesting magnification of the selected item.

Alternatively or additionally, the device 100 may receive a user motion input or a device motion input. For example, when the device 100 recognizes though a camera a user's motion of opening a hand or moving a hand away from the device 100, the device 100 may determine each input to be an input requesting magnification of the selected item.

Also, an input requesting reduction of a selected content may be performed in a similar method. For example, when a user input to draw a circle counterclockwise by using the input tool 200, a pinch-in input that the user moves two fingers in a state of touching the display 121 in directions toward each other, a reduction button input, a motion input that the user closes a hand, a motion input that a user's hand moves toward the device 100, or a motion input that the device 100 moves toward the user is received, the device 100 may determine each input to be an input requesting reduction of a selected part. However, the present exemplary embodiment is not limited thereto.

Figure 33:
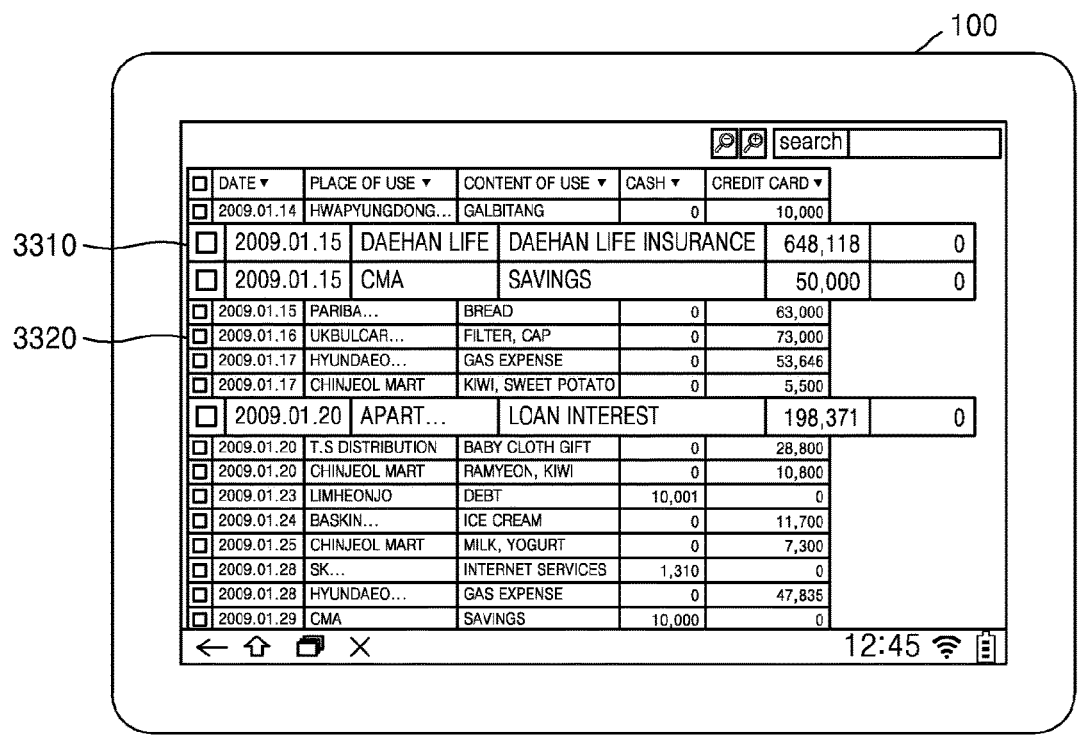
FIG. 33 is a view of a screen displaying a list by magnifying or reducing the same, according to an exemplary embodiment.

FIG. 33 is a view of a screen displaying a list by magnifying or reducing the same, according to an exemplary embodiment.

Referring to FIG. 33, when an input requesting magnification of a selected item is received, the device 100 may magnify a selected item 3310 and reduce an unselected item 3320. In this state, the device 100 may reduce the unselected item 3320 based on a magnification used for magnifying the selected item 3310. For example, when the selected item 3310 is magnified two times, the device 100 may reduce the unselected item 3320 0.5 times. When the selected item 3310 is magnified three times, the device 100 may reduce the unselected item 3320 ⅓ times. However, the present exemplary embodiment is not limited thereto, and the item included in the list may be magnified or reduced based on various magnifications.

Accordingly, as illustrated in FIG. 33, as the device 100 displays the selected item 3310 by magnifying the same and the unselected item 3320 by reducing the same, the user may recognize items at first sight.

Alternatively or additionally, the device 100 may display the selected item in 3D and the unselected item in 2D.

FIG. 34 is a view illustrating a method of selecting at least one item of a list, according to an exemplary embodiment.

Referring to FIG. 34, the device 100 executes a household account book application and display a financial expense list on a household account book application execution screen. Also, the device 100 may display a search window 3410 for searching a keyword on a household account book application execution screen.

The device 100 may select an item based on a search keyword input. For example, as illustrated in FIG. 34, the user may input a keyword into the search window 3410 by using the input tool 200. For example, the keyword may be related to a date of expense, a place of use of expense, a reason for expense, etc. However, the present exemplary embodiment is not limited thereto.

When a keyword is input and a search request input is received, the device 100 may search for the keyword and select an item including the keyword. Also, the device 100 may display the found keyword by highlighting the same.

For example, as illustrated in FIG. 34, when the user requests a search by inputting a keyword "Chinjeol Mart" 3420 where the user used money into the search window 3410, the device 100 may search for and select a first item 3431, a second item 3432, and a third item 3433 including the keyword "Chinjeol Mart" 3420 among the data of a section of a place of use Accordingly, the user may search for or select items of expenses spent on a date by inputting a date of expenses, items of expenses spent at a place by inputting a place of expenses, or items of expenses by inputting a keyword related to the expenses, through the keyword search.

Figure 35A:
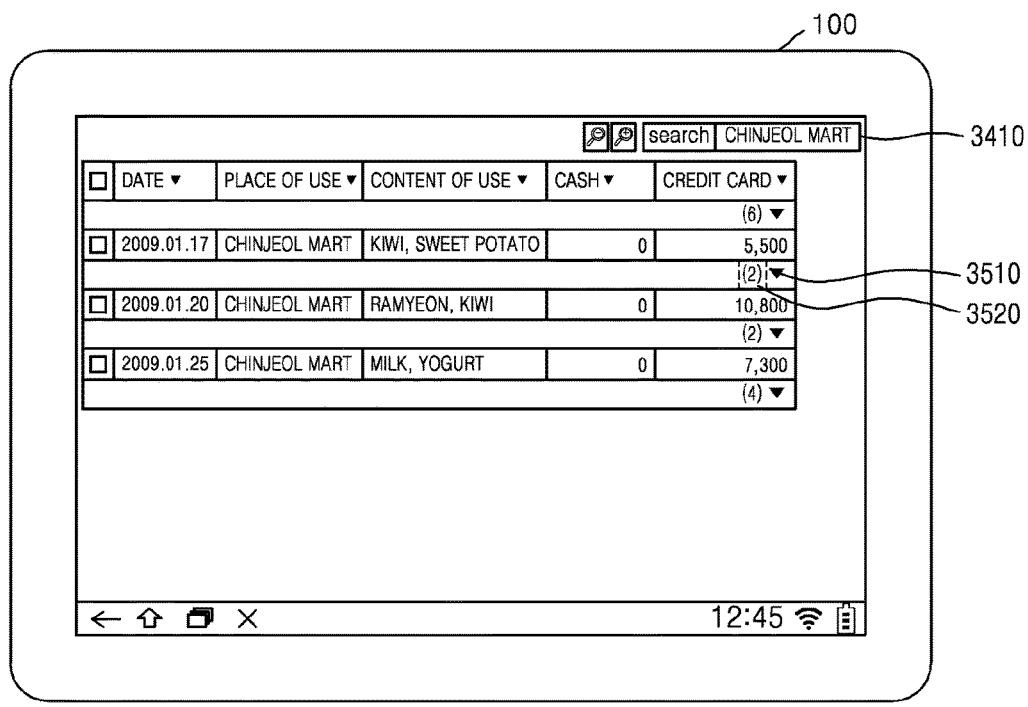
FIGS. 35A and 35B are views illustrating a method of displaying a modified list on a display, according to an exemplary embodiment.
Figure 35B:
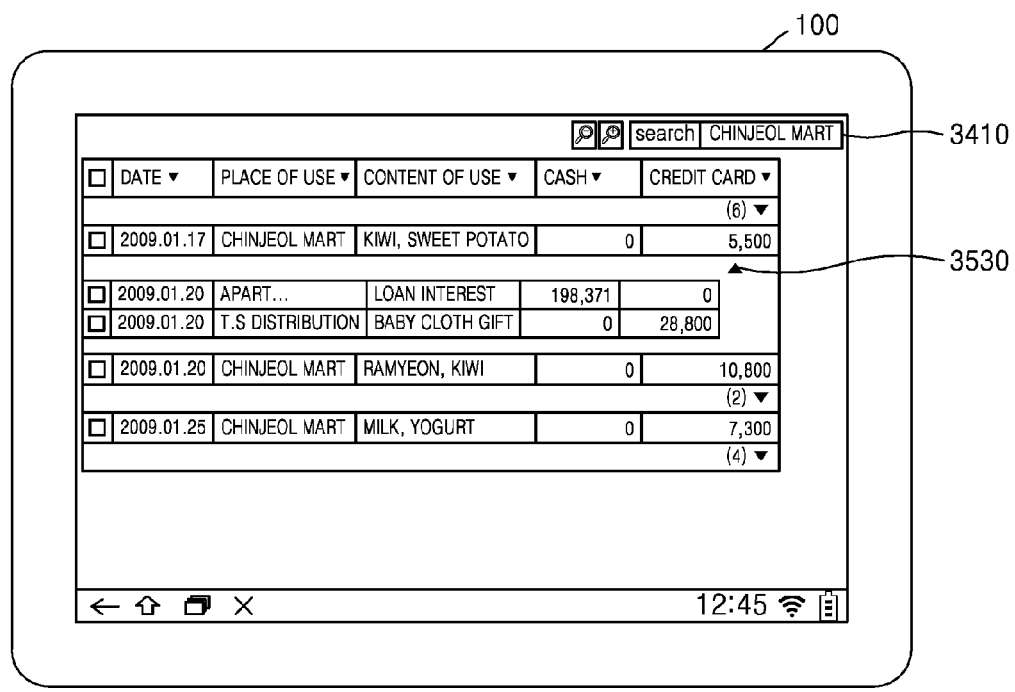

FIGS. 35A and 35B are views illustrating a method of displaying a modified list on the display 121, according to an exemplary embodiment.

The device 100 may receive an input of "folding" on a selected item among the list displayed on the display 121. For example, the input of "folding" may be an input to select an icon, for example, a folding icon, or an input to draw a circle clockwise or counterclockwise on the display 121 by using the input tool 200. Alternatively or additionally, the input of "folding" may be a pinch-in/out input that the user moves two fingers in a state of touching the display 121 in directions toward or away from each other. However, the present exemplary embodiment is not limited thereto.

When the input of "folding" is received, the device 100 may display only the selected items and may not display unselected items. In this state, the device 100 may display the selected items by magnifying the same at a preset magnification or an input magnification, as illustrated in FIG. 35A. Also, the device 100 may display an "unfolding" icon 3510 to display the unselected item on the display 121. Also, a number 3520 indicating the number of unselected items may be displayed.

When the user selects the "unfolding" icon 3510, as illustrated in FIG. 35B, the unselected item may be displayed again and the "unfolding" icon 3510 may be displayed by being changed to a "folding" icon 3530.

Also, when the user selects the "folding" icon 3530 again, as illustrated in FIG. 35A, the device 100 may display a selected item only and may not display an unselected item. The "folding" icon 3530 may be displayed by being changed to the "unfolding" icon 3510.

FIG. 36 is a view illustrating a method of displaying a modified list on a display, according to an exemplary embodiment.

The device 100 may make scroll speeds of the selected item and the unselected item display displayed on the list to be different from each other. For example, when an input that the user touches and drags a scroll bar 3610 is received, the device 100 may display the list by scrolling the same in a dragging direction. While the list is scrolled and the selected item is included in an area 3620 of a screen, the device 100 make a scroll speed to be different from an existing scroll speed. The existing scroll speed signifies a scroll speed when the scroll bar 3610 is touched and dragged without selecting an item from the list. Also, the area 3620 of a screen is not limited to the area illustrated in FIG. 36 and may be set to an area having a variety of sizes, shapes, and positions.

For example, when a selected item is included in the area 3620 of the screen, the scroll speed may be set to be slower than the existing scroll speed. Also, when the unselected item is included in the area 3620 of the screen, the scroll speed may be set to be faster than the existing scroll speed. However, the present exemplary embodiment is not limited thereto.

Figure 38:
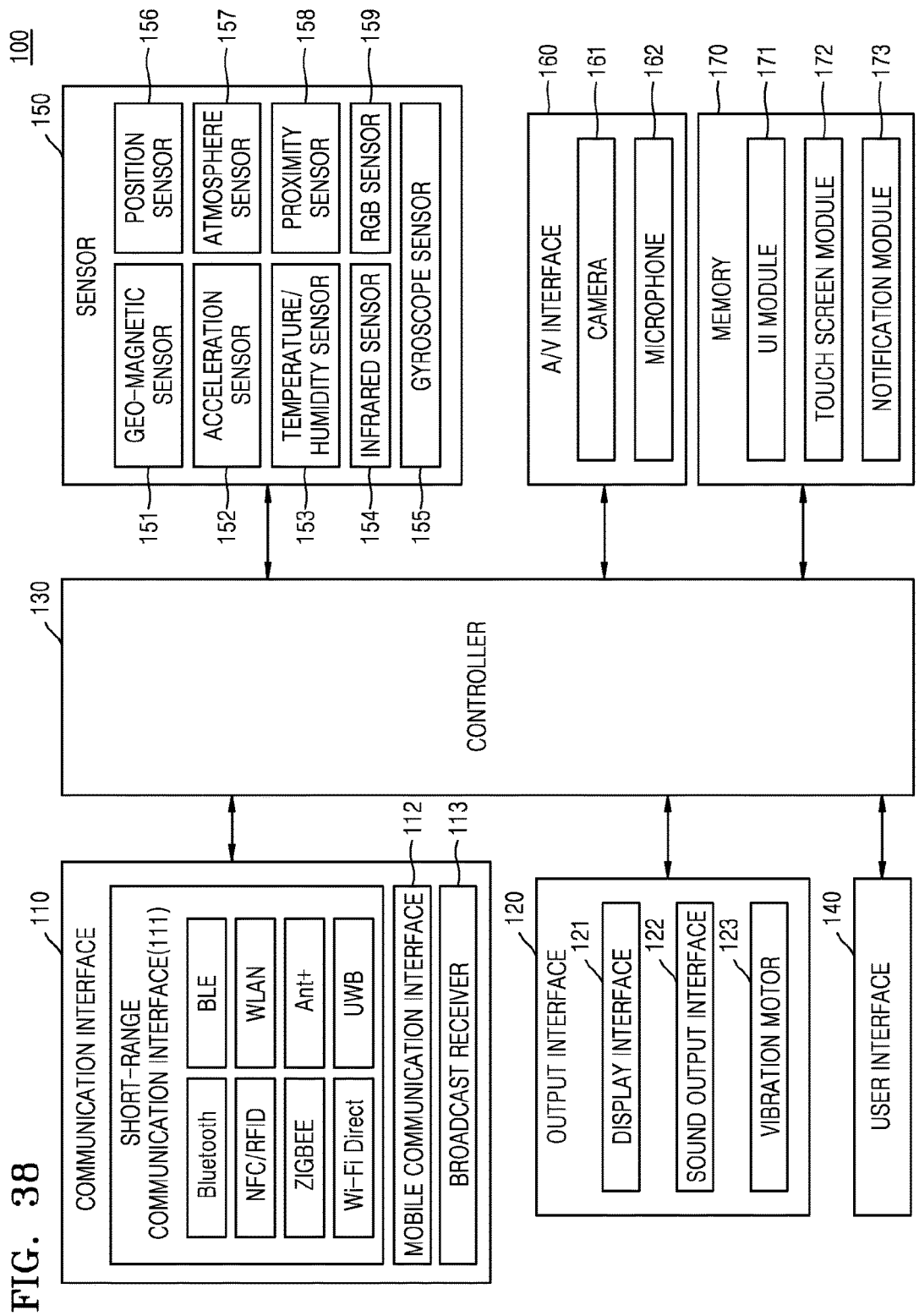
FIG. 38 is a block diagram of a structure of a device according to another exemplary embodiment.

FIG. 37 is a block diagram of a structure of the device 100 according to an exemplary embodiment; and FIG. 38 is a block diagram of a structure of the device 100 according to another exemplary embodiment.

As illustrated in FIG. 37, the device 100 includes a user interface 140, the display 121, and a controller 130. However, all illustrated elements are not necessarily essential, and the device 100 may be embodied by elements more or less than a number of the illustrated elements ones.

For example, as illustrated in FIG. 38, the device 100 further includes a communication interface 110, an output interface 120, a sensor 150, an audio/video (A/V) interface 160, and a memory 170, in addition to the user interface 140, the display 121, and the controller 130.

These elements are described below in detail.

The display 121 displays and outputs information processed by the device 100. For example, the display 121 may display a handwritten text content, a typed text content, an image content, a list, a reproduction screen of a video content, a reproduction screen of an audio content, etc.

Alternatively, when the display 121 and a touch pad constituting a layer structure form a touch screen, the display 121 may be used as an input device in addition to an output device. The display 121 may include at least one of a liquid crystal display, a thin film transistor-liquid crystal display, an organic light-emitting diode, a flexible display, a 3D display, and an electrophoretic display. Also, the device 100 may include two or more of the displays 121 according to an implement type of the device 100.

The user interface 140 signifies a device used by the user to input data to control the device 100. For example, the user interface 140 may include a key pad, a dome switch, a touch pad including a capacitive overlay type, a resistive overlay type, an infrared beam type, a surface acoustic wave type, an integral strain gauge type, and a piezoelectric type, a jog wheel, a jog switch, etc., but the present exemplary embodiment is not limited thereto.

The user interface 140 may receive a user input to select a part of a handwritten text content displayed on the display 121, a user input to select a part of a typed text content displayed on the display 121, a user input to select a part of an image content displayed on the display 121, a user input to select a part of an entire section of a video content, a user input to select a part of an entire section of an audio content, and a user input to select at least one of items in a list displayed on the display 121.

Also, the user interface 140 may receive a user input to magnify or reduce a content, a user input to change a reproduction speed of a video content or an audio content, etc. In this state, the user input may include a touch input, an input to draw a pattern, a button input, a user motion input, a device motion input, a voice input, etc., but the present exemplary embodiment is not limited thereto.

The controller 130, which is, for example, a processor, may control an overall operation of the device 100. For example, the controller 130 may control the communication interface 110, the output interface 120, the user interface 140, the sensor 150, the A/V interface 160, etc., by executing programs stored in the memory 170.

The controller 130 may display a selected handwritten text content and an unselected handwritten text content on the display 121 by magnifying or reducing the same at different magnifications.

The controller 130 may use the different magnification for magnifying or reducing the selected handwritten text content according to a thickness value, a color value, and a style value of an underline.

When a pinch-in/out input that the user moves two fingers in a state of touching the display 121 in directions toward or away from each other is received, the controller 130 may use the different magnification for magnifying or reducing a selected handwritten text content according to a distance moved by the two fingers.

The controller 130 may display a selected typed text content and an unselected typed text content on the display 121 by magnifying or reducing the same at different magnifications.

The controller 130 may display a selected image content and an unselected image content on the display 121 by magnifying or reducing the same at different magnifications.

The controller 130 may reproduce a selected section of a video content and an unselected section of the video content at different reproduction speeds.

The controller 130 may reproduce a selected section of an audio content and an unselected section of the audio content at different reproduction speeds.

When a pinch-in/out input to move two fingers in a state of touching the display 121 in directions toward or away from each other is received, the controller 130 may change an increase or decrease ratio of the reproduction speed of the selected section of the video content according to a distance moved by the two fingers.

When a pinch-in/out input to move two fingers in a state of touching the display 121 in directions toward or away from each other is received, the controller 130 may change an increase or decrease ratio of the reproduction speed of the selected section of the audio content according to a distance moved by the two fingers.

The controller 130 may display a selected item and an unselected item in a list on the display 121 by magnifying or reducing the same at different magnifications.

The communication interface 110 may include one or more constituent elements that enables communications between the device 100 and an external device. For example, the communication interface 110 includes a short-range wireless communication interface 111, a mobile communication interface 112, and a broadcast receiver 113.

The short-range wireless communication interface 111 may include a Bluetooth communication interface, a Bluetooth low energy (BLE) communication interface, a near field communication (NFC) unit, a WLAN (Wi-Fi) communication interface, a Zigbee communication interface, an infrared data association (IrDA) communication interface, a Wi-Fi Direct (WFD) communication interface, an ultra wideband (UWB) communication interface, an Ant+ communication interface, etc., but the present exemplary embodiment is not limited thereto.

The mobile communication interface 112 may transceive wireless signals with respect to at least one of a base station, an external terminal, and a server 300 through a mobile communication network. A wireless signal may include a voice call signal, a video call signal, or various types of data according to transceiving of text/multimedia messages.

The broadcast receiver 113 receives a broadcast signal and/or information related to broadcast from the outside through broadcast channels. A broadcast channel may include a satellite channel and a ground wave channel. In some embodiments, the device 100 may not include the broadcast receiver 113.

The communication interface 110 may transmit multimedia information stored in the memory 170 to the server 300. For example, the multimedia information may include images, text, graphics, sound, video, animation, etc., but the present exemplary embodiment is not limited thereto.

The output interface 120 outputs an audio signal, a video signal, or a vibration signal, and includes the display 121, a sound output interface 122, and a vibration motor 123.

The sound output interface 122 outputs audio data received from the communication interface 110 or stored in the memory 170. Also, the sound output interface 122 outputs a sound signal related to a function performed by first the device 100, for example, a call signal receipt sound, a message receipt sound, or an alarm sound. The sound output interface 122 may include a speaker, a buzzer, etc.

The vibration motor 123 may output a vibration signal. For example, the vibration motor 123 may output a vibration signal corresponding to an output of audio data or video data, for example, a call signal receipt sound or a message receipt sound. Also, when a touch is input to a touch signal, the vibration motor 123 may output a vibration signal.

The sensor 150 may sense a state of the device 100 or a state of the periphery of the device 100 and transfer sensed information to the controller 130.

The sensor 150 may include at least one of a geo-magnetic sensor 151, an acceleration sensor 152, a temperature/humidity sensor 153, an infrared sensor 154, a gyroscope sensor 155, a position sensor 156, for example, a global positioning system (GPS), an atmosphere sensor 157, a proximity sensor 158, and an RGB sensor 159, for example, an illuminance sensor, but the present exemplary embodiment is not limited thereto. Because the function of each sensor may be intuitively guessed by one of ordinary skill in the art from its name, a detailed description thereof is omitted.

The sensor 150 may sense a position of the device 100 by using a position sensor.

The A/V interface 160 is for inputting an audio signal or a video signal, and includes a camera 161 and a microphone 162. The camera 161 may acquire an image frame such as a still image or an execution through an image sensor in a video call mode or a photography mode. An image captured through the image sensor may be processed by the controller 130 or a separate image processor.

An image frame processed by the camera 161 may be stored in the memory 170 or transmitted to the outside through the communication interface 150. Two or more of the camera 161 may be provided.

The microphone 162 receives an external sound signal and processes the received signal into electric voice data. For example, the microphone 162 may receive a sound signal from an external device or a speaker. The microphone 162 may use various noise removal algorithms to remove noise generated in a process of receiving an input of an external sound signal.

The memory 170 may store a program of processing and controlling the controller 130 and data that is input and output.

The memory 170 may include at least one type of storage media, for example, memory of a flash memory type, a hard disk type, a multimedia card micro type, a card type, for example, SD or XD memory, etc., random access memory (RAM) static random access memory (SRAM), read-only memory (ROM), electrically erasable programmable read-only memory (EEPROM), programmable read-only memory (PROM), magnetic memory, magnetic disc, and an optical disc. Also, the device 100 may run a web storage or a cloud server that performs a storage function of the memory 170 on the Internet.

The programs stored in the memory 170 may be classified into a plurality of modules according to their functions, for example, a UI module 171, a touch screen module 172, a notification module 173, etc.

The UI module 171 may provide a UI or GUI engaged with the device 100 for each application. The touch screen module 172 may sense a user's touch gesture on a touch screen and transfer information about the touch gesture to the controller 130. The touch screen module 172 may recognize and analyze a touch code. The touch screen module 172 may be configured by separate hardware including a controller.

Various sensors may be provided inside or around the touch screen to sense a touch or proximity touch of the touch screen. An example of a sensor to sense a touch on a touch screen may be a tactile sensor. A tactile sensor signifies a sensor that detects a contact of an object to a degree or more that a human senses. The tactile sensor may detect various pieces of information such as a roughness of a contact surface, a rigidness of a contact object, a temperature of a contact position, etc.

Also, an example of a sensor for sensing a touch on a touch screen is a proximity sensor.

A proximity sensor signifies a sensor that detects an object approaching a predetermined detection surface or existence of an object existing in the vicinity by using a force of an electromagnetic field or using an infrared ray without mechanical contacts. The proximity sensor may include, for example, a transmissive photoelectric sensor, a direct reflective photoelectric sensor, a mirror reflective photoelectric sensor, a high frequency oscillating proximity sensor, a capacitive proximity sensor, a magnetic proximity sensor, an infrared proximity sensor, etc. The touch gesture of a user may include tapping, touching and holding, double tapping, dragging, panning, flicking, dragging and dropping, swiping, etc.

The notification module 173 may generate a signal to notify occurrence of an event in the device 100. The event occurring in the device 100 may include, for example, call signal receiving, message receiving, key signal input, schedule notification, etc. The notification module 173 may output a notification signal in form of a video signal through the display 121, an audio signal through the sound output interface 122, or a vibration signal through the vibration motor 123.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A device comprising:
   a display configured to display multimedia content and a timeline, the timeline indicating a reproduction time point of the multimedia content;
   a user interface configured to receive a first input that selects a first position and a second position on the timeline, the first position and the second position defining a selected section of the displayed multimedia content; and
   a processor configured to change at least one of a first reproduction speed of the selected section of the displayed multimedia content and a second reproduction speed of an unselected section of the displayed multimedia content, so as to be different from each other,
   wherein the user interface is further configured to receive a close pinch or an open pinch in which two fingers touch the first position and the second position and move in directions toward or away from each other, respectively, and
   wherein the processor is further configured to change the first reproduction speed, relative to the second reproduction speed, according to the directions and a distance of movement of the two fingers, based on the close pinch or the open pinch being received.

2. The device of claim 1, wherein the processor is further configured to change the first reproduction speed of the selected section of the displayed multimedia content to be faster than the second reproduction speed of the unselected section of the displayed multimedia content, based on the close pinch being received via the user interface.

3. The device of claim 1, wherein the processor is further configured to change the first reproduction speed of the selected section of the displayed multimedia content to be slower than the second reproduction speed of the unselected section of the displayed multimedia content, based on the open pinch being received via the user interface.

4. The device of claim 1, wherein the user interface is further configured to receive a first time point and a second time point of the multimedia content as the first input, and
   the processor is further configured to determine the selected section of the displayed multimedia content to be between the first time point and the second time point.

5. The device of claim 1, wherein the processor is further configured to control a reproduction volume of the selected section of the displayed multimedia content and a reproduction volume of the unselected section of the displayed multimedia content to be different from each other.

6. The device of claim 1, wherein the user interface is further configured to receive a second input that selects an object included in a first frame among a plurality of frames of the multimedia content, and
   wherein the processor is further configured to extract at least one second frame that includes the object among the plurality of frames, and reproduce the extracted at least one second frame and an unextracted frame at different reproduction speeds.

7. A method of providing content of a device, the method comprising;
   displaying multimedia content and a timeline, the timeline indicating a reproduction time point of the multimedia content;
   receiving a first input that selects a first position and a second position on the timeline, the first position and the second position defining a selected section of the displayed multimedia content; and
   changing at least one of a first reproduction speed of the selected section of the displayed multimedia content and a second reproduction speed of an unselected section of the displayed multimedia content, so as to be different from each other,
   the method further comprising receiving a close pinch or an open pinch in which two fingers touch the first position and the second position and move in directions toward or away from each other, respectively,
   wherein the changing comprises changing the first reproduction speed, relative to the second reproduction speed, according to the directions and a distance of movement of the two fingers, based on the close pinch or the open pinch being received.

8. The method of claim 7, wherein the changing comprises changing the first reproduction speed of the selected section of the displayed multimedia content to be faster than the second reproduction speed of the unselected section of the displayed multimedia content, based on the close pinch being received.

9. The method of claim 7, wherein the changing comprises changing the first reproduction speed of the selected section of the displayed multimedia content to be slower than the second reproduction speed of the unselected section of the displayed multimedia content, based on the open pinch being received.

10. The method of claim 9, wherein the changing comprises changing a reproduction volume of the selected section of the displayed multimedia content and a reproduction volume of the unselected section of the displayed multimedia content to be different from each other.

11. A non-transitory computer-readable recording medium having recorded thereon instructions executable by a processor of a device having a display to cause the device to perform operations comprising:
  displaying multimedia content and a timeline, the timeline indicating a reproduction time point of the multimedia content;
  receiving a first input that selects a first position and a second position on the timeline, the first position and the second position defining a selected section of the displayed multimedia content; and
  change at least one of a first reproduction speed of the selected section of the displayed multimedia content and a second reproduction speed of an unselected section of the displayed multimedia content, so as to be different from each other,
  wherein the operations further comprises receiving a close pinch or an open pinch in which two fingers touch the first position and the second position and move in directions toward or away from each other, respectively,
  wherein the changing comprises changing the first reproduction speed, relative to the second reproduction speed, according to the directions and a distance of movement of the two fingers, based on the close pinch or the open pinch being received.

12. The non-transitory computer-readable recording medium of claim 11, wherein the operations further comprise:
  controlling a reproduction volume of the selected section of the displayed multimedia content and a reproduction volume of the unselected section of the displayed multimedia content to be different from each other.

* * * * *